(12) United States Patent
Buhrman et al.

(10) Patent No.: US 8,663,369 B2
(45) Date of Patent: Mar. 4, 2014

(54) SEPARATION OF GASES PRODUCED BY COMBUSTION

(75) Inventors: Frederik Arnold Buhrman, Laguna (PH); Jingyu Cui, Katy, TX (US); Mahendra Ladharam Joshi, Katy, TX (US); Stanley Nemec Milam, Houston, TX (US); Scott Lee Wellington, Bellaire, TX (US)

(73) Assignee: Shell Oil Company, Houston, TX (US)

( * ) Notice: Subject to any disclaimer, the term of this patent is extended or adjusted under 35 U.S.C. 154(b) by 357 days.

(21) Appl. No.: 13/149,222

(22) Filed: May 31, 2011

(65) Prior Publication Data

US 2011/0296869 A1 Dec. 8, 2011

Related U.S. Application Data

(60) Provisional application No. 61/350,265, filed on Jun. 1, 2010.

(51) Int. Cl.
*B01D 19/00* (2006.01)

(52) U.S. Cl.
USPC ............ 95/261; 95/241; 95/269; 55/340; 55/396; 55/457; 261/76; 261/116

(58) Field of Classification Search
USPC .......... 55/338, 340, 396, 457; 95/241, 261, 95/269; 261/76, 116
See application file for complete search history.

(56) References Cited

U.S. PATENT DOCUMENTS

| | | | |
|---|---|---|---|
| 1,961,203 A | 6/1954 | De Baufre | |
| 3,199,270 A | 8/1965 | Oehlrich | |
| 4,061,476 A | 12/1977 | Holter et al. | |
| 4,182,480 A | 1/1980 | Theyse et al. | |
| 4,235,607 A | 11/1980 | Kinder et al. | |
| 4,261,708 A * | 4/1981 | Gallagher | 95/270 |
| 4,969,931 A | 11/1990 | Wu et al. | |
| 5,024,684 A | 6/1991 | Tank | |
| 5,042,998 A | 8/1991 | Beusen | |
| 5,346,674 A | 9/1994 | Weinwurm et al. | |
| 5,520,249 A | 5/1996 | Minkkinen et al. | |
| 6,391,199 B1 | 5/2002 | Diemer et al. | |
| 7,261,766 B2 | 8/2007 | Betting et al. | |
| 2004/0265199 A1 | 12/2004 | MacKnight | |
| 2005/0076782 A1 | 4/2005 | Weinbren | |
| 2006/0233685 A1 | 10/2006 | Janes | |
| 2007/0148069 A1 | 6/2007 | Chakravarti et al. | |

(Continued)

FOREIGN PATENT DOCUMENTS

| | | |
|---|---|---|
| DE | 2551722 | 5/1977 |
| DE | 102008004144 | 7/2007 |

(Continued)

*Primary Examiner* — Robert A Hopkins

(57) ABSTRACT

The present invention is directed to a method and a system for separating gas components of a combustion gas. A compressible feed stream derived from a combustion gas that contains at least one target compressible component and at least one non-target compressible component is mixed in a substantially co-current flow with an incompressible fluid stream comprising an incompressible fluid in which the target component(s) is/are capable of being preferentially absorbed. Rotational velocity is imparted to the mixed streams, separating an incompressible fluid in which at least a portion of the target component is absorbed from a compressible product stream containing the non-target compressible component(s). The compressible feed stream may be provided at a stream velocity having a Mach number of at least 0.1.

17 Claims, 6 Drawing Sheets

(56) References Cited

U.S. PATENT DOCUMENTS

| | | |
|---|---|---|
| 2008/0173363 A1 | 7/2008 | Betting |
| 2008/0196582 A1 | 8/2008 | Tjeenk Willink et al. |
| 2009/0031756 A1 | 2/2009 | Betting et al. |
| 2010/0006803 A1 | 1/2010 | Bravo et al. |

FOREIGN PATENT DOCUMENTS

| | | |
|---|---|---|
| DE | 202010002826 | 8/2010 |
| EP | 0008594 | 3/1980 |
| EP | 1017465 | 1/1999 |
| EP | 1140363 | 7/2000 |
| EP | 1438540 | 4/2003 |
| FR | 2343941 | 9/1977 |
| GB | 2000692 | 1/1979 |
| GB | 2079177 | 1/1982 |
| JP | 59169903 | 9/1984 |
| JP | 3150203 | 6/1991 |
| JP | 2006025914 | 2/2006 |
| JP | 2006117485 | 5/2006 |
| JP | 2008284543 A * | 11/2008 |
| WO | 9517948 | 7/1995 |
| WO | 9614138 | 5/1996 |
| WO | 9913949 | 3/1999 |
| WO | 9913969 | 3/1999 |
| WO | 0056844 | 9/2000 |
| WO | 2006087332 | 8/2006 |
| WO | 2008073860 | 6/2008 |
| WO | 2008116732 | 10/2008 |
| WO | 2008130244 | 10/2008 |
| WO | 2009002174 | 12/2008 |
| WO | 2009072612 | 6/2009 |
| WO | 2009084945 | 7/2009 |
| WO | 2009140993 | 11/2009 |

* cited by examiner

SEPARATION OF GASES PRODUCED BY COMBUSTION

FIELD OF THE INVENTION

The invention relates to the separation of one or more components from a fluid stream containing a plurality of components. More particularly, the invention relates to a system and method for removing one or more compressible components from a compressible flue gas stream using a separation device and an incompressible fluid.

BACKGROUND OF THE INVENTION

Numerous methods and apparatus exist for separating components from a fluid stream containing gases, liquids and/or solids. Conventional separation apparatuses include distillation columns, stripping columns, filters and membranes, centrifuges, electrostatic precipitators, dryers, chillers, cyclones, vortex tube separators, and absorbers. These methods and devices are relatively ineffective and/or inefficient in separating gas components of gaseous mixtures.

For example, a commonly utilized system and method for separation of hydrogen sulfide (H2S) or carbon dioxide (CO2) from a gas stream involves using a series of stripping columns to absorb target gaseous components into a solvent/reactant followed by the distillation of the solvent/reactant to recover the target gas components. The equipment involved usually requires a large footprint due to the numerous pieces of process equipment needed for such a separation scheme. Such a process may also suffer from high energy consumption requirements and solvent/reactant loss during operation.

A conventional amine plant exemplifies the requirements of an absorption/distillation sequence used to remove a target component from a gas stream. In general, this process involves contacting a gas stream comprising a target component with a reactant in a stripping column. The gas removed from the stripping column is clean gas with the majority of the target component removed. The reactant is conventionally an amine that forms a complex with a target component such as carbon dioxide. The target-component enriched complex then passes to a regenerator tower, which may be a stripping column or distillation tower, where the complex is heated to release the target component. Additional equipment required to operate the amine unit typically includes flash tanks, pumps, reboilers, condensers, and heat exchangers. When the gas stream contains too high of a target component concentration, the energy required to remove the target component may exceed the useful chemical energy of the stream. This limitation sets an upper concentration level of the target component at which the process can be economically operated. This process also suffers from a high energy consumption, solvent loss, and a large footprint, making the process impracticable for offshore use.

Separation of gaseous components of a gas mixture has also been effected by contacting the gas mixture with selectively permeable filters and membranes. Filtration and membrane separation of gases include the selective diffusion of one gas through a membrane or a filter to effect a separation. The component that has diffused through the membrane is usually at a significantly reduced pressure relative to the non-diffused gas and may lose up to two thirds of the initial pressure during the diffusion process. Thus, filters and membrane separations require a high energy consumption due to the energy required to re-compress the gas diffused through the membrane and, if the feed stream is at low pressure, the energy required to compress the feed stream to a pressure sufficient to diffuse one or more feed stream components through the membrane. In addition, membrane life cycles can vary due to plugging and breakdown of the membrane, requiring additional downtime for replacement and repair.

Centrifugal force has been utilized to separate gaseous components from gas-liquid feed streams. For example, cyclones utilize centrifugal force to separate gaseous components from gas-liquid fluid flows by way of turbulent vortex flow. Vortices are created in a fluid flow so that heavier particles and/or liquid droplets move radially outward in the vortex, thus becoming separated from gaseous components. Within a cyclone, the gas and liquid feed stream flow in a counter-current flow during separation such that the heavier components and/or liquid droplets are separated from the gaseous components by gravity in a downward direction after the initial separation induced by the vortex while the gaseous components are separated in the opposite direction. Considerable external energy must be added to cyclones to achieve effective separation.

U.S. Pat. No. 6,524,368 (Betting et al.) refers to a supersonic separator for inducing condensation of one or more components followed by separation. Betting is directed to the separation of an incompressible fluid, such as water, from a mixture containing the incompressible fluid and a compressible fluid (gas). In this process, a gas stream containing an incompressible fluid and a compressible fluid is provided to a separator. In the separator, the gas stream converges through a throat and expands into a channel, increasing the velocity of the gas stream to supersonic velocities, inducing the formation of droplets of the incompressible fluid separate from the gas stream (and the compressible fluid therein). The incompressible fluid droplets are separated from the compressible fluid by subjecting the droplets and the compressible fluid to a large swirl thereby separating the fluid droplets from the compressible fluid by centrifugal force. The system involves a significant pressure drop between the inlet and outlet streams, and a shock wave occurs downstream after the separation, which may require specialized equipment to control.

It has been proposed to utilize centrifugal force to separate gas components from a gaseous mixture. In a thesis by van Wissen (R. J. E. VAN WISSEN, CENTRIFUGAL SEPARATION FOR CLEANING WELL GAS STREAMS: FROM CONCEPT TO PROTOTYPE (2006)), gas centrifugation is described for separating two compressible fluids in the absence of an incompressible fluid. The separation is carried out using a rotating cylinder to create a plurality of compressible streams based on the difference in the molecular weight of the gaseous components. As noted in the thesis, the potential to separate compressible components such as carbon dioxide from light hydrocarbons is limited by the differences in molecular weights between the components. As such, centrifuges cannot provide a highly efficient separation when the component molecular weights are close to one another. Such a design also suffers from an extremely low separation throughput rate that would require millions of centrifuges to handle the output of a large gas source.

What is needed is a separation apparatus and method that provides high separation efficiency of compressible components while avoiding or reducing pressure drop, and the need to supply large amounts of external energy.

SUMMARY OF THE INVENTION

In one aspect, the present invention is directed to a method comprising providing a compressible feed stream comprised of a first compressible component and a second compressible component, where the compressible feed stream is derived from a combustion source; providing an incompressible fluid stream comprised of an incompressible fluid capable of absorbing the first compressible component or reacting with the first compressible component; mixing the compressible feed stream and the incompressible fluid stream to form a mixed stream, where the compressible feed stream is provided for mixing at a first linear velocity in a first direction and the incompressible fluid stream is provided for mixing at a second linear velocity in a second direction, the second linear velocity having a velocity component in the same direction as the first direction, where the mixed stream has an instantaneous third linear velocity in a third direction and is comprised of the second compressible component and a constituent selected from the group consisting of a mixture of the first compressible component and the incompressible fluid, a chemical compound or adduct of a reaction between the first compressible component and the incompressible fluid, and mixtures thereof; imparting a rotational velocity to the mixed stream, where the rotational velocity is tangential or skew to the direction of the instantaneous third linear velocity of the mixed stream; and separating an incompressible fluid product stream from the mixed stream, where the incompressible fluid product stream comprises at least a portion of the constituent of the mixed stream, and where the incompressible fluid product stream is separated from the mixed stream as a result of the rotational velocity imparted to the mixed stream.

In another aspect, the present invention is directed to a system comprising a separation device that: 1) receives a) an incompressible fluid stream comprised of an incompressible fluid, and b) a compressible feed stream comprised of a first compressible component and a second compressible component, where the compressible feed stream is derived from a combustion process, and 2) discharges a first compressible product stream comprising at least 60% of the second compressible component and an incompressible fluid product stream comprising at least 60% of the first compressible component; an incompressible fluid regenerator that receives the incompressible fluid product stream and discharges a second compressible product stream enriched in the first compressible component and a first compressible component-depleted incompressible fluid product stream; and an incompressible fluid injection device that receives the first compressible component-depleted incompressible fluid product stream and mixes the first compressible component-depleted incompressible fluid product stream with the compressible feed stream.

In yet another aspect, the invention is directed to a method comprising: providing a compressible feed stream comprised of a first compressible component and a second compressible component, where the compressible feed stream is derived from a combustion source; selecting an incompressible fluid and providing an incompressible fluid stream comprising the incompressible fluid, wherein the incompressible fluid is selected to selectively absorb or react with the first compressible component relative to the second compressible component; mixing the compressible feed stream and the incompressible fluid stream in a substantially co-current flow to form a mixed stream; inducing a rotational velocity to the mixed stream; and separating an incompressible fluid product stream from a compressible product stream, where the incompressible fluid product stream comprises an increased amount of the first compressible component relative to the incompressible fluid stream and the compressible product stream comprises a reduced amount of the first compressible component relative to the compressible feed stream, and where the incompressible fluid product stream is separated from the mixed stream as a result of the rotational velocity imparted to the mixed stream.

The features and advantages of the present invention will be apparent to those skilled in the art. While numerous changes may be made by those skilled in the art, such changes are within the spirit of the invention.

BRIEF DESCRIPTION OF THE DRAWINGS

These drawings illustrate certain aspects of some of the embodiments of the present invention, and should not be used to limit or define the invention.

DETAILED DESCRIPTION OF THE INVENTION

The system and method of the present invention utilize a centrifugal force to remove one or more compressible target components, such as $CO_2$, sulfur compounds, or nitrogen compounds from a feed gas stream while limiting pressure drop and energy consumption. Gaseous target components can be removed from a feed gas stream with lower energy consumption than a conventional process, such as an amine process. For example, a flue gas stream may be processed using the system and method of the present invention to remove at least some carbon dioxide prior to venting the flue gas to the atmosphere. The flue gas processing may occur with a higher efficiency and lower energy consumption than other processes. The pressure drop between the feed and product streams may also be limited, avoiding or at least limiting re-compression needs downstream of the process relative to conventional gas separation processes. The process also utilizes relatively few pieces of equipment, thus limiting the overall footprint of the process. The systems and methods of the present invention utilize an incompressible fluid to aid in the removal of a target component from the gas stream. Certain advantages of specific embodiments will be described in more detail below.

Figure 1:
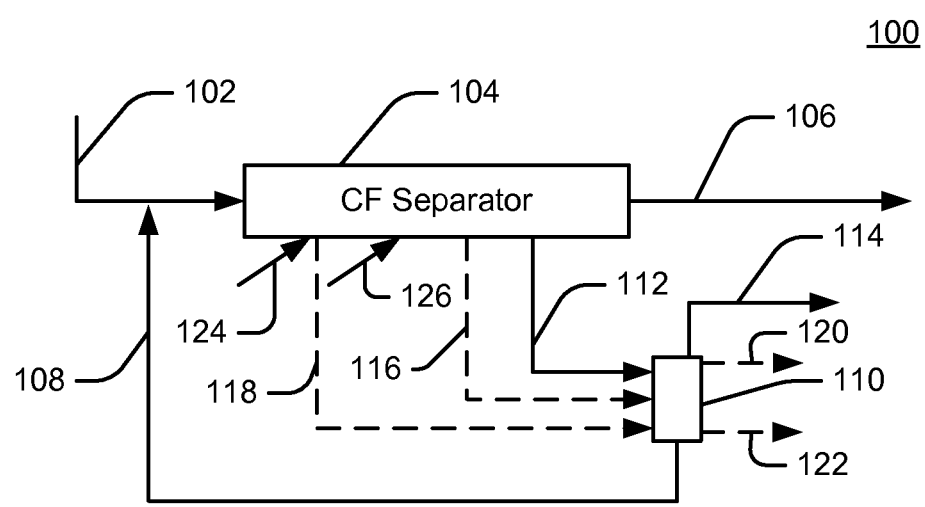
FIG. 1 schematically illustrates an embodiment of a separation process of the invention.

Referring to FIG. 1, an embodiment of a system 100 is shown having a compressible feed stream 102, an incompressible fluid stream 108, a separation device 104, a first compressible product stream 106, a plurality of incompressible product streams 112, 116, 118, and an incompressible fluid regenerator 110 that produces one or more second compressible product streams 114, 120, 122. The process functions to separate a compressible target component from the compressible feed stream 102 and produces a first compressible product stream 106 and one or more second compressible product stream(s) 114, 120, 122. The number of compressible product streams will depend on the number of target components or target component groups that are removed from the compressible feed stream 102. As used herein, the term "target component" refers to one or more compressible components that are separated from the compressible feed stream individually or as a group, and the use of the term in the singular can include a plurality of compressible components. The compressible feed stream 102 comprises a plurality of compressible components, at least one of which is to be separated from other compressible components of the compressible feed stream 102.

An incompressible fluid stream 108 comprised of an incompressible fluid is provided that is mixed with the compressible feed stream 102 in a substantially co-current flow to create a mixed stream comprising a mixture of compressible components and incompressible fluid prior to, upon entering, and/or within the separation device 104. In an embodiment, optional incompressible fluid streams 124 & 126 may be provided and mixed in a substantially co-current flow with the compressible components within the separation device to further enhance the separation of the compressible components.

As used herein, mixing an incompressible fluid stream and a compressible feed stream in a "substantially co-current flow" refers to a process in which the compressible feed stream is provided for mixing at a first linear velocity in a first direction, the incompressible fluid stream is provided for mixing at a second linear velocity in a second direction, where the second linear velocity has a velocity component in the same direction as the first direction of the first linear velocity of the compressible feed stream (e.g. the second linear velocity of the incompressible fluid stream has a vector directed along an axis defined by the first direction of the first linear velocity of the compressible feed stream in the direction of the first direction), and the compressible feed stream having the first linear velocity in the first direction is mixed with the incompressible fluid stream having the second linear velocity in the second direction to form the mixed stream having a third linear velocity in a third direction. As used herein, the "linear velocity" refers to a velocity vector with a direction for a specified component or stream at a specific time or at a specific point within the separation device which does not necessarily have a constant direction with respect to one or more axes of the separation device. The linear velocity of the mixed stream may change direction with time, therefore the third direction is defined herein as the direction of the instantaneous linear velocity of the mixed stream (i.e. the instantaneous third linear velocity). The instantaneous third linear velocity of the mixed stream may have a velocity component in the same direction as the first direction of the first linear velocity of the compressible feed stream and/or may have a velocity component in the same direction as the second direction of the second linear velocity of the incompressible fluid stream (i.e the mixed stream has a flow that is substantially co-current with the flow of the compressible feed stream and/or the incompressible fluid stream). In an embodiment of the process of the invention, the direction of the instantaneous third linear velocity of the mixed stream (e.g. the third direction) may change during the process. In an embodiment of the invention, the first direction of the first linear velocity of the compressible feed stream, the second direction of the second linear velocity of the incompressible fluid stream, and the third direction of the third linear velocity of the mixed stream are the same (e.g. the compressible feed stream, the incompressible fluid stream, and the mixed stream have a co-current flow). The magnitude of the first linear velocity of the compressible feed stream, the second linear velocity of the incompressible fluid stream, and the third linear velocity of the mixed stream, may vary relative to each other.

In the separation device 104, the target component is absorbed by or reacted with the incompressible fluid of the incompressible fluid stream 108 and is separated from the other "non-target" compressible components of the mixed stream. As used herein, the term "a mixture of a compressible component and an incompressible fluid" includes a composition in which the compressible component (i.e. a target component) is absorbed in an incompressible fluid. In an embodiment, the separation device 104 is a centrifugal force separator in which a rotational velocity is imparted to the mixed stream and the incompressible fluid containing the target component is separated from the other compressible components of the mixed stream due to the rotational motion of the mixed stream flowing through the separator. The rotational motion within a centrifugal force separator can also create a stratification within the compressible components of the mixed stream. The heavier compressible and incompressible components of the mixed stream are separated towards the wall of the separation device. This stratification can further increase any heavy target component loading within the incompressible fluid.

As used herein, the term "rotational velocity" refers to the velocity of a stream, flow, or component about an axis in a rotational motion, where the axis may be defined by the direction of the instantaneous linear velocity of the stream, flow, or component. The rotational velocity may be tangential or skew to the axis defined by the direction of the instantaneous linear velocity of the stream. For example, the rotational velocity imparted to the mixed stream may be tangential or skew to the third direction (e.g. the direction of the instantaneous third linear velocity, which is the instantaneous linear velocity of the mixed stream) or may be tangential or skew to the first direction (e.g. the direction of the first linear velocity, which is the linear velocity of the compressible feed stream). Also, as used herein, the "resultant velocity" refers to the total velocity of a specified component, flow, or stream including its linear velocity and rotational velocity components.

In an embodiment, the first compressible product stream 106 leaves the separation device and can be used for various downstream purposes. The incompressible fluid product stream 112 and optional incompressible fluid product streams 116, 118 leave the separation device 104 and may pass to a second separation process 110 where at least some of the target component (e.g., H2S, $CO_2$) may be removed from the incompressible fluid product stream(s). The target component may pass out of the second separation process 110 as one or more second compressible product streams 114, 120, 122. Regenerated incompressible fluid may leave the second separation process 110 to be used as, inter alia, the incompressible fluid stream 108 that is combined and mixed with the compressible feed stream 102.

[[[Compressible Stream Description]]]

In an embodiment of the invention, the compressible feed stream generally includes any multi-component compressible gas that it is desirable to separate into two or more compressible product streams. The compressible feed stream may be a flue gas comprising multiple components. As used herein, "flue gas" refers to a compressible gas produced by the combustion of a fuel source that could be exhausted to the atmosphere through a flue, which is a pipe or channel for conveying exhaust gases from a combustion device such as a combustion chamber, oven, furnace, boiler, incinerator, turbine, or steam generator. In an embodiment, a flue gas may refer to any combustion exhaust gas produced at a power plant. Flue gases can be produced from a variety of fuel sources. For example, flue gas may be emitted as a result of the combustion of fuels such as natural gas, gasoline/petrol, diesel fuel, fuel oil, coal, or organic matter such as wood or biomass. In an embodiment, a high sulfur fuel can be used as the combustion source for a flue gas. A high sulfur fuel can comprise hydrogen sulfide or other sulfur compounds that can result in the production of sulfur oxides (e.g., sulfur dioxide) in the flue gas stream. Exemplary high sulfur fuels can include sour natural gas, biomass containing high levels of sulfur, or a purified hydrogen sulfide stream.

The flue gas composition depends on the fuel composition and type of combustion device used, as described in more detail below. In general, flue gases derived from the combustion of hydrocarbons comprise nitrogen derived from the combustion air, carbon dioxide ($CO_2$), and water vapor as well as excess oxygen derived from the combustion air. It further may contain a small percentage of pollutants such as particulate matter (e.g., liquid droplets and/or solid particles), carbon monoxide, nitrogen oxides, sulfur oxides, organic matter, and potentially non-combustible inorganic matter such as heavy metals contained in coal.

The type of combustion device can also affect the flue gas composition. In general, combustion devices may be classified as direct fired devices and indirect fired devices. In this context, the terms "direct" and "indirect" refer to whether or not the combustion of the fuel is allowed to come in contact with the material being heated. For example, a boiler using natural gas in a heat exchanger with an aqueous fluid would be characterized as an indirect fired device since the natural gas combustion does not come into direct contact with the aqueous fluid being heated. Alternatively, cement kilns typically use natural gas combustion in direct contact with limestone to produce powdered cement. Thus, these cement kilns would be considered direct fired devices.

The flue gas composition in an indirect fired device would generally include the components listed above, as only the combustion products from the fuel will be present in the exhaust gases. The inclusion of trace components in the fuel may result in the release of those components to the exhaust stream. For example, any trace component found in a coal may be contained within the flue gas upon combustion.

Direct fired devices can result in exhaust gases comprising additional components. These components may be the materials in direct contact with the combustion fuel or they may be derived from the materials in contact with the combustion, or they may be some combination thereof. For example, a flue gas at a cement kiln may contain some particulate cement derived from the limestone being heated and may also contain some additional carbon dioxide derived from the calcination of the calcium carbonate limestone. Additional examples of direct fired combustion sources include metal production from ores. The exhaust stream produced by the production of elemental metals may contain one or more metals, metal oxides, metal sulfides, or other metal complexes. Incinerators can be another direct fired source that can comprise additional components.

The compressible feed stream may generally be at a pressure ranging from 1 bar (0.1 MPa) to 60 bar (6 MPa) from a combustion device. The process may utilize a pressure adjusting device such as a blower or compressor to change the pressure of the exhaust stream in order to pass it through the separation device described herein.

The temperature of the compressible feed stream will vary with the source of the flue gas. In general most chemical processes benefit from the extraction of as much heat as possible for use within the processes. Thus the exhaust temperature of a flue gas can vary from 75° C. to 400° C. depending on the specific process design. The temperature of the compressible feed stream may be based on the dew point of the compressible feed stream, the target component composition, the incompressible fluid composition, and the design of the separation device. In an embodiment, the compressible feed stream is pre-conditioned, for example by passing the compressible feed stream through a heat exchanger, such that the compressible feed stream temperature is at or near the freezing point of the incompressible fluid used in the process. For example, the compressible feed stream may be conditioned so that the compressible feed stream temperature is within 50° C. of the freezing point of the incompressible fluid selected for the process.

[[[Outlet Stream Descriptions]]]

The separation process and system described herein can generate a number of product streams. The first compressible component (e.g., the target component) of the compressible feed stream can be absorbed or reversibly reacted with the incompressible fluid of the incompressible fluid stream upon mixing the compressible feed stream and the incompressible fluid stream. An incompressible product stream containing the incompressible fluid and at least a portion of the first compressible component and/or a chemical compound or adduct of a reaction between the incompressible fluid and the first compressible component is formed upon separation of the incompressible fluid from the stream comprising a mixture of the compressible feed stream and the incompressible fluid stream The second compressible component of the compressible feed stream can pass through the separation process to form a compressible product stream.

Additional components may pass through the separation device with the second compressible component and be contained within the compressible product stream. For example, an incompressible fluid product stream containing carbon dioxide and a compressible product stream containing oxygen and nitrogen may be produced from a flue gas stream containing carbon dioxide treated in accordance with a process and in a system of the present invention.

In an embodiment of the process and/or system of the present invention, multiple incompressible fluid streams may be mixed in a substantially co-current flow with the compressible feed stream and then separated from the mixed stream to generate multiple incompressible fluid product streams. Such an embodiment may be useful when the compressible feed stream comprises a plurality of target components for removal. Each incompressible fluid of the individual incompressible fluid streams may be selected to selectively absorb or react (preferably reversibly) with a selected target component in the compressible feed stream. The multiple incompressible fluid streams may be mixed with the compressible feed stream and separated from the mixed stream in a single separator device or in multiple separator devices. In a single separator device, in general, the heaviest compressible components, including those absorbed or reacted with the incompressible fluids, will be removed first after imparting rotational velocity to the mixture of the compressible feed stream and incompressible fluid stream(s). When multiple separation devices are used, the separation devices may be used in series to remove one or more components in each separation device optionally using a plurality of incompressible fluids.

The incompressible fluid product stream can be treated to desorb or reversibly release the portion of the first compressible component (e.g., the target component) to form a second compressible product stream. In an embodiment in which a plurality of incompressible fluid product streams are formed, a plurality of compressible product streams can be formed by treating the incompressible fluid product streams to desorb or reversibly release the portion of the compressible feed stream captured by the incompressible fluid product streams.

Additional components beyond the target components may also be removed from the compressible feed stream. For example, the compressible feed stream may comprise an incompressible solid component (e.g., the particulate matter pollutants in the flue gas stream). The compressible feed stream may also include non-solid incompressible components that are liquid at the operating conditions of the process, for example, water. These components can be removed separately from other target components of the compressible feed stream by controlling the operating conditions of the process and system.

In an embodiment of the invention, a centrifugal separator device used to effect the process is structured to enable the removal of one or more compressible target components, and one or more additional components such as solid components, condensable components, and/or water along the length of a separation section of the separator device. The separator device may include a plurality of outlet ports. Use of a plurality of outlet ports allows the various components within the compressible feed stream to be removed from the separation device in a plurality of product streams with each product stream enriched in a certain type of additional component or incompressible fluid containing one or more compressible target components. Each compressible target component may then be removed from a system including the separator device as a separate compressible product stream or compressible products stream upon regeneration of an incompressible fluid stream from an incompressible fluid product stream separated from the mixed stream of compressible components and incompressible fluid(s). The first compressible product stream comprises the remainder of the components from the compressible feed stream not separated and removed from the feed stream as a target component by an incompressible fluid or separated as a solid or liquid from the compressible feed stream in the system.

In an embodiment, the first and second compressible product streams have different concentrations of at least two compressible components relative to the compressible feed stream. The separation process is capable of separating a compressible target component from the compressible feed stream resulting in a first compressible product stream from which at least a portion of the target component has been separated and at least one second compressible product stream enriched in the target component. For example, in one embodiment, the invention provides a method comprising: providing a compressible feed stream comprised of a first compressible component and a second compressible component, where the compressible feed stream is derived from a combustion source; providing an incompressible fluid stream comprised of an incompressible fluid capable of absorbing the first compressible component or reacting with the first compressible component; mixing the compressible feed stream and the incompressible fluid stream to form a mixed stream, where the compressible feed stream is provided for mixing at a first linear velocity in a first direction and the incompressible fluid stream is provided for mixing at a second linear velocity in a second direction, the second linear velocity having a velocity component in the same direction as the first direction, where the mixed stream has an instantaneous third linear velocity in a third direction and is comprised of the second compressible component and a constituent selected from the group consisting of a mixture of the first compressible component and the incompressible fluid, a chemical compound or adduct of a reaction between the first compressible component and the incompressible fluid, and mixtures thereof; imparting a rotational velocity to the mixed stream, where the rotational velocity is tangential or skew to the direction of the instantaneous third linear velocity of the mixed stream; and separating an incompressible fluid product stream from the mixed stream, where the incompressible fluid product stream comprises at least a portion of the constituent of the mixed stream, and where the incompressible fluid product stream is separated from the mixed stream as a result of the rotational velocity imparted to the mixed stream.

[[[Incompressible Fluids]]]

In an embodiment, a variety of incompressible fluids may be used to remove one or more target components from the compressible feed stream. Any incompressible fluid capable of absorbing a target component or reacting, preferably reversibly reacting, with a target component upon contact may be used to remove one or more of the target components in the compressible feed stream. The choice of incompressible fluid may depend on the target component to be removed, the properties of the compressible feed stream, the properties of the incompressible fluid, and the conditions of the process or within the separation device. In an embodiment, the solubilities of each component of the compressible feed stream in the incompressible fluid, and their relative solubilities in the incompressible fluid may determine, at least in part, the choice of incompressible fluid. The selection of the incompressible fluid may be determined, at least in part, by a consideration of the driving forces for the solubility of the compressible target component(s) and non-target component(s) in the incompressible fluid. The driving forces can include, but are not limited to, polar bonding forces, London dispersion forces, Van derWaals forces, induced dipole forces, hydrogen bonding, and any other intermolecular forces that affect solubility of one component in another.

In an embodiment, the incompressible fluid is a physical solvent. Physical solvents include any solvents capable of absorbing a component of the compressible feed stream without forming a new chemical compound or adduct. In general, gas solubilities in liquids increase as the temperature of the liquid is decreased. Further, gas solubilities are related to partial pressures within the gas phase such that higher partial pressures tend to result in greater loading within a liquid in contact with the gas. However, exceptions to these general principles do exist. These general principles indicate that when a physical solvent is used to remove one or more target components of the compressible feed stream, the solvent should be cooled or sub-cooled to a temperature near the freezing point of the solvent if possible. In an embodiment, a mixture of physical solvents, including a mixture of physical solvents and water, is used within the process as the incompressible fluid to separate one or more target components from the compressible feed stream.

In an embodiment, methanol is used as an incompressible fluid for removing carbon dioxide and H2S (and mercaptans to a lesser degree) from the compressible feed stream. Water can be combined with methanol to alter the freezing point allowing for operation of the process at various temperatures. Table 1 lists the freezing point of a solution of methanol and water at varying concentrations. In an embodiment of the present invention, the methanol or methanol/water mixture may be cooled to near its freezing point. For example, methanol or a methanol/water mixture may be used at a temperature of between −40° F. and −145° F. (−40° C. and −98° C.)

TABLE 1

| Methanol/Water % wt. | Freezing Point, ° F. | Freezing Point, ° C. |
|---|---|---|
| 0/100 | 32 | 0 |
| 10/90 | 20 | −7 |
| 20/80 | 0 | −18 |
| 30/70 | −15 | −26 |

TABLE 1-continued

| Methanol/Water % wt. | Freezing Point, ° F. | Freezing Point, ° C. |
|---|---|---|
| 40/60 | −40 | −40 |
| 50/50 | −65 | −54 |
| 60/40 | −95 | −71 |
| 70/30 | −215 | −137 |
| 80/20 | −220 | −143 |
| 90/10 | −230 | −146 |
| 100/0 | −145 | −98 |

Other suitable physical solvents that may be utilized as the incompressible fluid include dimethyl ether of polyethylene glycol (DEPG), N-methyl-2-pyrrolidone (NMP), and propylene carbonate (PC). DEPG is a mixture of dimethyl ethers of polyethylene glycol of the general formula:

$$CH_3O(C_2H_4O)_nCH_3$$

where n is an integer ranging from 2 to 9. DEPG can be used for operations at temperatures ranging from 0° F. (−18° C.) to 347° F. (175° C.). DEPG can be used for separating, inter alia, carbon dioxide and a number of sulfur compounds from natural gas. NMP demonstrates a high selectivity for $H_2S$ over $CO_2$, though both are absorbed. NMP can be used for operations at temperatures ranging from ambient to 5° F. (−15° C.). PC can be used for operations at temperatures ranging from 0° F. (−18° C.) to 149° F. (65° C.). PC can be used for separating, inter alia, carbon dioxide and a number of sulfur compounds from natural gas.

Physical solvents may also be used to remove sulfur compounds such as sulfur dioxide from the compressible feed stream. Suitable physical solvents for removing sulfur dioxide include, but are not limited to, aqueous solutions of sodium citrate, potassium citrate, sodium sulfite, and fluorinated amines. The terms potassium citrate and sodium citrate refer to any compound in which the citrate is in the form of the mono-, di- or tricitrate ion, alone or in combination, as well as in which the potassium or sodium ion is supplied by potassium or sodium salts other than the citrate. The solvents can generally be regenerated through the application of heat to liberate the sulfur dioxide. The sulfur dioxide can be liquified and transported, or further treated to form sulfuric acid, elemental sulfur, or any other sulfur compound known to those of ordinary skill in the art.

Potassium citrate and sodium citrate will absorb sulfur dioxide at temperatures ranging from 15° C. to 80° C. in a general pH range of 3 to 9. As a general trend, the cooler the absorption liquid the greater the amount of sulfur dioxide that can be absorbed in the solvent. The sulfur dioxide absorbed by an aqueous solution of sodium citrate or potassium citrate can be stripped by heating the solution to a temperature between 100° C. and 150° C., for example using steam or a heat exchanger.

In another embodiment, a fluorinated amine of the general formula $C_{(8+x)}F_{(17+x)}3N$ can be used to absorb sulfur dioxide at a temperature up to 260 C and a pressure of 1 bar to 100 bar. The sulfur dioxide absorbed in the fluorinated amine can be oxidized to form sulfuric acid through the introduction of oxygen to the solution, or the sulfur dioxide can be stripped by heating the solution.

The selection of a physical solvent depends on the desired characteristics of the separation process including, but not limited to, the solvent selectivity for the target component or components, the effect of water content in the compressible feed stream, the non-target component solubility in the solvent, solvent cost, solvent supply, and thermal stability. Specific solvent properties are listed in Table 2 and Table 3.

TABLE 2

Physical Properties

| Property | DEPG | PC | NMP | Methanol |
|---|---|---|---|---|
| Viscosity at 25° C. (cP) | 5.8 | 3.0 | 1.65 | 0.6 |
| Specific Gravity at 25° C. (kg/m³) | 1030 | 1195 | 1027 | 785 |
| Molecular Weight | varies | 102 | 99 | 32 |
| Vapor Pressure at 25° C. (mmHg) | 0.00073 | 0.085 | 0.40 | 125 |
| Freezing Point (° C.) | −28 | −48 | −24 | −98 |
| Boiling Point at 760 mmHg (° C.) | 275 | 240 | 202 | 65 |
| Thermal Conductivity (Btu/hr-ft-° F.) | 0.11 | 0.12 | 0.095 | 0.122 |
| Maximum Operating Temperature (° C.) | 175 | 65 | — | — |
| Specific Heat 25° C. | 0.49 | 0.339 | 0.40 | 0.566 |
| CO2 Solubility (ft³/gal) at 25° C. | 0.485 | 0.455 | 0.477 | 0.425 |

TABLE 3

Relative Solubility

| Gas Component | DEPG at 25° C. | PC at 25° C. | NMP at 25° C. | Methanol at −25° C. |
|---|---|---|---|---|
| Hydrogen | 0.013 | 0.0078 | 0.0064 | 0.0054 |
| Nitrogen | 0.020 | 0.0084 | — | 0.012 |
| Oxygen | — | 0.026 | 0.035 | 0.020 |
| Carbon Monoxide | 0.028 | 0.021 | 0.021 | 0.020 |
| Methane | 0.066 | 0.038 | 0.072 | 0.051 |
| Ethane | 0.42 | 0.17 | 0.38 | 0.42 |
| Ethylene | 0.47 | 0.35 | 0.55 | 0.46 |
| Carbon Dioxide | 1.0 | 1.0 | 1.0 | 1.0 |
| Propane | 1.01 | 0.51 | 1.07 | 2.35 |
| i-Butane | 1.84 | 1.13 | 2.21 | — |
| n-Butane | 2.37 | 1.75 | 3.48 | — |
| Carbonyl Sulfide | 2.30 | 1.88 | 2.72 | 3.92 |
| Acetylene | 4.47 | 2.87 | 7.37 | 3.33 |
| Ammonia | 4.80 | — | — | 23.2 |
| Hydrogen Sulfide | 8.82 | 3.29 | 10.2 | 7.06 |
| Nitrogen Dioxide | — | 17.1 | — | — |
| Methyl Mercaptan | 22.4 | 27.2 | — | — |
| Carbon Disulfide | 23.7 | 30.9 | — | — |
| Ethyl Mercaptan | — | — | 78.8 | — |
| Sulfur Dioxide | 92.1 | 68.6 | — | — |
| Dimethyl Sulfide | — | — | 91.9 | — |
| Thiopene | 540 | — | — | — |
| Hydrogen Cyanide | 1200 | — | — | — |

In an embodiment, the incompressible fluid is a chemical solvent. As used herein, a chemical solvent is any solvent that reacts with one or more target components to form a different chemical compound or adduct. Preferably the reaction is reversible so the chemical solvent may then be regenerated from the distinct chemical compound or adduct by further processing. For example, direct or indirect heating using steam may be used to break a different chemical compound or adduct into a regenerated chemical solvent molecule and the compressible target component in some circumstances.

The reaction of a chemical solvent comprising an amine with carbon dioxide is useful as an example of one chemical solvent reaction cycle. The reaction of the amine containing compound with carbon dioxide proceeds according to equation 3.

$$R-NH_2 + CO_2 \leftrightarrows R-NH-COO^- + H^+ \quad \text{(Eq. 3)}$$

In the reaction shown in equation 3, the forward reaction is exothermic while the reverse reaction is endothermic. The amount of heat required to reverse the carbamate formation complex during the solvent regeneration process depends, at least in part, on the heat of reaction for the specific reactants. Solvents with lower heats of reaction require less energy for regeneration than those having higher heats of reaction.

In an embodiment, the chemical solvent comprises an amine. Suitable compounds comprising amines include, but are not limited to, monoethanolamine, diethanolamine, methyldiethanolamine, diisopropylamine, or diglycolamine. In another embodiment, an aqueous solution of potassium carbonate may be used to remove one or more target components when both carbon dioxide and sulfur dioxide are present in the compressible feed stream.

Other chemical solvents useful for the removal of sulfur dioxide include, but are not limited to, an aqueous solution of sodium sulfite, and aqueous solutions of lime or limestone. When used to absorb sulfur dioxide, an aqueous solution of sodium sulfite reacts with sulfur dioxide to form sodium bisulfite. The sodium sulfite can be regenerated through the application of heat to the solution to decompose the sodium bisulfite back to the original aqueous solution. In an embodiment, aqueous solutions of lime or limestone can be used to remove sulfur dioxide. Once absorbed, sulfur dioxide reacts with limestone to produce carbon dioxide and calcium sulfite while sulfur dioxide reacts with lime to produce water and calcium sulfite. In another embodiment, a combination of sodium sulfite and lime or limestone can be used to separate sulfur dioxide from the compressible feed stream. In this embodiment, an aqueous solution of sodium sulfite is used to absorb sulfur dioxide from the compressible feed stream and is subsequently reacted with lime or limestone to regenerate the sodium sulfite for reuse. This process produces calcium sulfite as a by-product.

An incompressible fluid stream comprising a physical solvent and/or a chemical solvent may be combined with the compressible feed stream using a misting nozzle to generate micro scale droplets, as discussed in more detail below. The incompressible fluid stream pressure will generally be determined by the amount of pressure required to inject the incompressible fluid into the compressible feed stream. The incompressible fluid stream pressure may be between 1 bar (0.1 MPa) and 200 bar (20 MPa), or alternatively between 50 bar (5 MPa) and 100 bar (10 MPa).

[[[Separation Device Description]]]

A separation device can be used to separate one or more target components from a compressible feed stream using an incompressible fluid. Suitable separation devices include any device capable of separating an incompressible fluid product stream by 1) imparting a rotational velocity to a mixed stream of an incompressible fluid and compressible components and/or 2) by forming a mixed stream having a rotational velocity component upon mixing an incompressible fluid stream and a compressible feed stream. Preferably the separation device is structured to form the mixed stream and/or impart rotational velocity to a mixed stream. The mixed stream is comprised of the incompressible fluid; a constituent selected from the group consisting of a mixture of the first compressible component and an incompressible fluid from the incompressible fluid stream, a chemical compound or adduct of a reaction between the first compressible component and the incompressible fluid, and mixtures thereof; and a second compressible component from the compressible feed stream. Imparting rotational velocity to the mixed stream or forming a mixed stream having rotational velocity provides rotational velocity to, at least, the constituent of the mixed stream, and generally provides rotational velocity to all the elements of the mixed stream. The linear velocity of the second compressible component of the compressible feed stream or the mixed stream may also be increased at some point in the separation device.

In the mixed stream having a rotational velocity component the difference in momentum between the compressible components not absorbed in the incompressible fluid (i.e. the second compressible component) and the incompressible fluid incorporating the first compressible component of the compressible feed stream therein (i.e. the constituent of the mixed stream) can be used to effect a separation of the compressible components and the incompressible fluid incorporating the first compressible component therein. For example, a rotational velocity may be imparted to the mixed stream to cause a continuous change in the direction of flow, thus inducing a centrifugal force on the mixed stream. In this example, the incompressible fluid moves outward in response to the centrifugal force where it may impinge on a surface and coalesce for collection. In each case, the separator results in the separation of an incompressible fluid from the mixed stream which may be used to separate one or more target components from the compressible feed stream provided the target component is absorbed by or reacted with the incompressible fluid.

In an embodiment, a compressible feed stream is mixed with an incompressible fluid in a separation device to absorb one or more target components in the incompressible fluid. As used herein, a target component may be "absorbed" in the incompressible fluid by physical absorption or by chemically reacting with the incompressible fluid to form a chemical compound or adduct with the incompressible fluid. The chemical reaction may be a reversible chemical reaction.

The compressible feed stream and the incompressible fluid are mixed to allow for absorption of one or more target components from the compressible feed stream into the incompressible fluid thereby producing a mixed stream containing one or more compressible components and an incompressible fluid in which one or more target components are absorbed. The mixed stream is passed through the separation device to produce an incompressible fluid product stream containing one or more target components and a compressible product stream comprising the compressible components from the compressible feed stream that are not absorbed into the incompressible fluid. The separating device uses centrifugal force to separate the incompressible fluid product stream from the compressible product stream. The centrifugal force can also cause the compressible components of the compressible feed stream to stratify within the separator, increasing the concentration of the higher molecular weight components near the outer layers of the circulating gas stream. As used herein, higher molecular weight compressible components comprise those components of a gas stream with greater molecular weights than other components in the stream. In an embodiment in which the target component comprises one or more higher molecular weight components, the stratification may result in an increased separation efficiency of the target components.

Suitable separation devices for use with the present invention include any substantially co-current centrifugal force separation device capable of separating a liquid from a gas, and optionally causing gas stratification within a separation section of the device. The materials of construction of the separation device may be chosen based on the compressible feed stream composition, the incompressible fluid composition, and the operating parameters of the system. In an embodiment, the separation device may be constructed of stainless steel 316 to protect from corrosion.

In an embodiment, one suitable separation device includes an AZGAZ in-line gas/liquid separator (available from Merpro of Angus, Scotland). The AZGAZ device utilizes both an internal settling structure along with a swirl inducing structure to remove incompressible liquid droplets from a compressible gas stream.

In an embodiment of the present invention, a compressible feed stream is combined with an incompressible fluid to form a mixed fluid stream using any means known for injecting an incompressible fluid into a compressible stream. For example, an atomizing nozzle may be used to inject a stream of finely divided incompressible droplets into the compressible feed stream. In another embodiment, a plurality of nozzles may be used to distribute an incompressible fluid within the compressible feed stream. The design of such a system may depend on the flowrates of the incompressible fluid relative to the flowrate of the compressible feed stream, the geometry of the system, and the physical properties of the incompressible fluid.

In an embodiment, an atomizer or misting nozzle may be used to generate micro sized droplets (100 to 200 micron size) of an incompressible fluid. The generation of micro sized droplets can create a large surface area for absorption and small diffusion distance for an efficient absorption of one or more target components in the compressible feed stream into the incompressible fluid. The interfacial area available for contact between the incompressible fluid droplets and target components can be around 40,000 $m^2/m^3$ of mixing space. The volumetric incompressible fluid phase mass transfer coefficient can be 7 to 8 $s^{-1}$. This can be an order of magnitude higher than conventional contacting towers.

Industrial atomizer or misting nozzle designs can be based on either high pressure incompressible fluid (e.g., a liquid) or they can be based on a gas assist nozzle design. In high-pressure liquid nozzles, the incompressible fluid pressure is used to accelerate the incompressible fluid through small orifices and create shear forces inside nozzle passages that break down the incompressible fluid into micron size droplets. The shear energy is supplied by the high-pressure incompressible fluid and is therefore called a high pressure atomizer. In the case of gas assist atomizer nozzles, the inertial force created by supersonic gas jets (e.g., natural gas, $CO_2$, air, nitrogen, or steam) shears the incompressible fluid jets while inside the atomizer nozzle and as the incompressible fluid jet exits the atomizer nozzle, breaking the incompressible fluid jet into micron size droplets. Industrial atomizers and misting nozzles suitable for use with the incompressible fluids of the present invention are available from Spraying System Co. of Wheaton, Ill.

Industrial atomizers or misting nozzle designs can create either a solid cone spray pattern or a hollow cone spray pattern. Hollow cone spray patterns can break up incompressible fluids in a shorter distance and are therefore preferred for use with the present invention. The nozzle orifice size and spraying angle are designed based on incompressible fluid flow capacities and pressure drop across the nozzle.

The compressible feed stream is combined in a substantially co-current flow with the incompressible fluid stream and passed through a separation device in order to at least partially separate one or more target component(s) from the non-target component(s) of the compressible feed stream. The distance between the point at which the compressible feed stream is combined with the incompressible fluid stream and the entrance to the separation section of the separation device provides contact space for one or more target components to absorb into the incompressible fluid. The distance between the incompressible fluid injection point and the separation section of the separation device can be adjusted to provide for a desired contact time.

Figure 2:
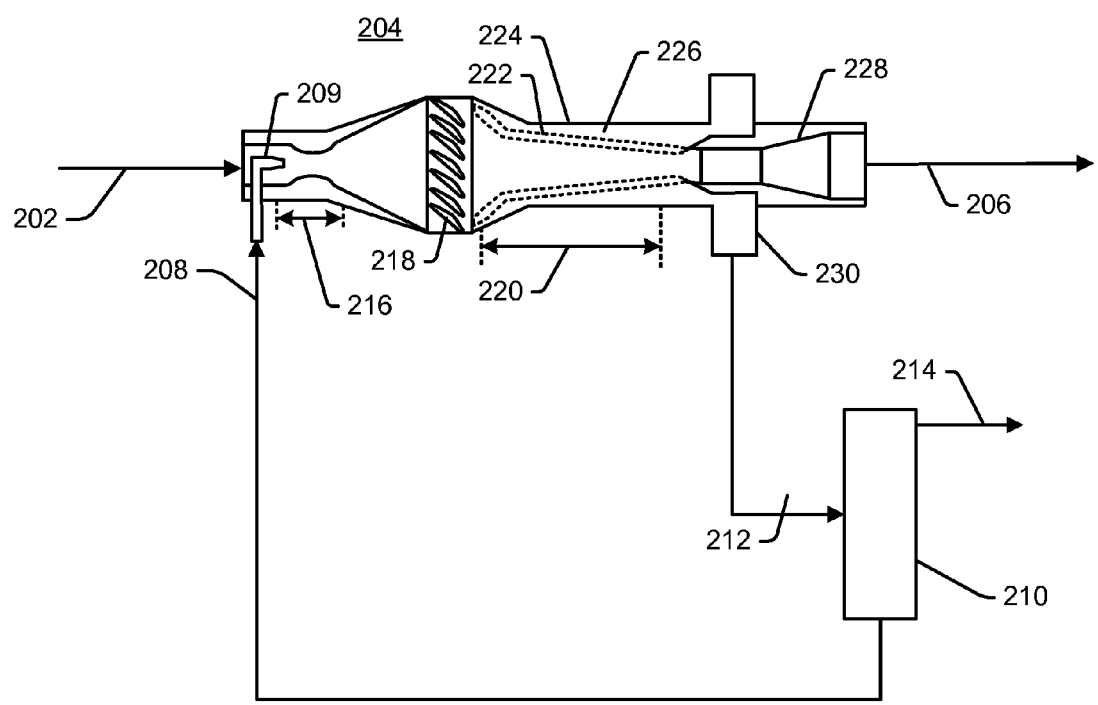
FIG. 2 schematically illustrates another embodiment a separation process of the invention.

In an embodiment as shown in FIG. 2, the separation device 204 is a centrifugal force separator. The centrifugal force separator 204 generally has an inlet or throat section 216, a swirl inducing structure 218 for imparting a rotational velocity component to the mixed incompressible fluid stream and the compressible feed stream and at the same time enhancing absorption of one or more target components contained in the compressible feed stream 202 into an incompressible fluid, a separation section 220 for removing any incompressible fluid or solid components from the mixed stream, and a diffuser section 228. An incompressible fluid injection nozzle 209 for injecting a fine mist of incompressible fluid 208 into the compressible feed stream 202 may be located within the separation device in some embodiments. For example, the incompressible fluid injection nozzle may be located in the separation device upstream of the throat section or between the throat section and the swirl inducing structure. Alternatively, the incompressible fluid injection nozzle or optionally a plurality of incompressible fluid injection nozzles are located within the separation section of the separation device downstream of the swirl inducing structure. In some embodiments, the incompressible fluid injection nozzle 209 can be located upstream of the separation device 204. In some embodiments, the incompressible fluid injection nozzle 209 can be located within the swirl inducing structure. The separation section 220 of the separation device 204 may include a collection space 226 for collecting any separated incompressible fluid from the separation device 204.

The throat section 216, if included in the separation device, may serve as an inlet for the compressible feed stream, which may be mixed with the incompressible fluid stream, prior to the compressible feed stream entering the separation device 204. In general, the compressible feed stream will enter the separation device 204 and throat section 216 at subsonic speeds. In general, the throat section 216 serves to impart an increased linear velocity to the compressible feed stream and its components (e.g. the first and second compressible components) prior to passing the compressible feed stream through the separation device. In some embodiments, the throat section comprises a converging section, a narrow passage, and a diverging section through which the compressible feed stream or mixed stream passes. Some embodiments may not have all three sections of the throat section depending on fluid flow considerations and the desired velocity profile through the separation device. The converging section and narrow passage can impart an increased linear velocity to the compressible feed stream or mixed stream as it passes through. In some embodiments, the throat section serves as an inlet section and does not contain a converging passageway or throat. In an embodiment, the throat section 216 is upstream of the swirl inducing structure such that the compressible feed stream, which can be mixed with the incompressible fluid stream, passes through the throat section and then through the swirl inducing structure prior to reaching the separation section of the device. However, the swirl inducing structure can be located within the narrow passage of the throat section in order to impart a rotational velocity to the compressible feed stream, which can be mixed with the incompressible fluid stream, prior to increasing the velocity of the compressible feed stream in the diverging section of the throat section. In another embodiment, the swirl inducing section can be annular or ring shaped with a conical shape solid section in the center for smooth transition of the compressible feed stream or mixed stream leaving the throat section and passing over the swirl inducing structure.

The throat section may increase the linear velocity of the mixed stream, and may increase the velocity of at least the compressible components to a supersonic velocity or a transonic velocity, or the velocity of the mixed stream may remain subsonic. The linear velocity and/or resultant velocity of the compressible feed stream, the incompressible fluid stream, the mixed stream—including the compressible and incompressible components of the mixed stream—and the first compressible product stream can be described in terms of the Mach number. As used herein, the Mach number is the speed of an object (e.g. the compressible feed stream, the incompressible fluid stream, the mixed stream and/or components thereof, and/or the first compressible product stream moving through a fluid (e.g. air) divided by the speed of sound in the fluid. The flow regimes that may be obtained through the separation device can be described in terms of the Mach number as follows: subsonic velocity is a Mach number less than 1.0, transonic velocity is a Mach number ranging from 0.8 to 1.2, and supersonic is any velocity greater than 1.0 and generally greater than 1.2. The specific design of the throat section along with the compressible feed stream properties (e.g., temperature, pressure, composition, flowrate, etc.) will, at least in part, determine the flow regime of the stream exiting the throat section and the corresponding Mach number. In an embodiment, the compressible feed stream or the mixed stream exiting the throat section will have a flowrate with a Mach number of greater than 0.1, or alternatively, greater than 0.2, 0.3, 0.4, 0.5, 0.6, 0.7, 0.8, 0.9, or 1.0. In an embodiment, the mixed stream entering the separation section of the separation device may have a flowrate with a Mach number of greater than 0.1, or alternatively, greater than 0.2, 0.3, 0.4, 0.5, 0.6, 0.7, 0.8, 0.9, or 1.0.

In an embodiment, the compressible components in the mixed stream, e.g. the first and second compressible components from the compressible feed stream, may have a Mach number that is different from the Mach number of the incompressible fluid in the mixed stream. For example, one or more of the compressible components in the mixed stream may have a supersonic Mach number while the incompressible fluid in the mixed stream has a subsonic Mach number. One or more of the compressible components of the mixed stream may have a Mach number of greater than 0.1 or 0.2, 0.3, 0.4, 0.5, 0.6, 0.7, 0.8, 0.9, 1.0, 1.1, 1.2, or 1.3. Independently, the incompressible fluid in the mixed stream may have a Mach number of at least 0.1, or 0.2, 0.3, 0.4, 0.5, 0.6, 0.7, 0.8, 0.9, or 1.0.

As noted above, the swirl inducing structure 218 imparts a rotational velocity component to the mixed stream containing the compressible feed stream and the incompressible fluid stream. As the mixed stream enters the separation device 204, its velocity may have a substantially linear component. As shown in FIG. 2, a swirl inducing structure 218 is placed in the internal passageway of the separation device. In another embodiment, the swirl inducing structure may be placed within the narrow passage of the throat section or downstream of the throat section as a ring or annular shape with solid conical shape in the center.

The swirl inducing structure may also increase the linear velocity of the compressible components of the mixed stream (e.g. the first and second compressible components from the compressible feed stream) relative to the linear velocity of the compressible components entering the swirl inducing structure. The swirl inducing structure may be configured having a curved diverging structure to increase the linear velocity of the compressible components of the mixed stream while imparting a rotational velocity component to the mixed stream.

The swirl inducing structure 218 may be any suitable structure, or any method for imparting a swirl, so long as a rotational velocity component is imparted to the mixed stream of the compressible feed stream and the incompressible fluid stream. The swirl inducing structure 218 imparts a rotational velocity component to the flow of the mixed stream causing a vortex to form, where the magnitude of the rotational velocity component is a function of the geometry of the swirl inducing structure. This may include the angle of the static guide vanes, or the specific geometry of a wing placed in the flow path. Suitable swirl inducing structures can include, but are not limited to, static guide vanes, wing like structures, structures containing one or more sharp edges, deflection vanes for generating vortices (e.g., V-shape, diamond shape, half delta, chevrons), and curvilinear tubes (e.g., helical tubes). In an embodiment, the swirl inducing structure may impart a rotational velocity to the gas ranging from 500 revolutions per minute ("rpm") to 30,000 rpm.

In some embodiments, the swirl inducing structure can comprise one or more incompressible fluid injection nozzles. In some embodiments, the incompressible fluid injection nozzles can be located within the swirl inducing structure. For example, if a wing is used as the rotational flow inducing structure, the incompressible fluid injection nozzles can be located on the trailing edge of the wing so that the incompressible fluid is mixed with the compressible feed stream through the turbulent flow off the wing. In some embodiments, the incompressible fluid injection nozzle can be oriented to impart a rotational velocity component to the compressible feed stream in addition to the rotational velocity component imparted by the swirl inducing structure.

In another embodiment (not shown in FIG. 2), the swirl inducing structure may comprise one or more inlet stream injection devices for abruptly changing the direction of the mixed stream or the compressible feed stream. In this embodiment, one or more incompressible fluid injection nozzles can be oriented such that the incompressible fluid is injected into the compressible feed stream at an angle relative to the linear velocity of the compressible feed stream. The resulting mixed stream will have a rotational velocity component primarily based on the angle of injection and the velocity at which the incompressible fluid is injected into the compressible feed stream, and will have a linear velocity component primarily based on the linear velocity of the compressible feed stream. The resultant velocity with rotational and linear velocity components will depend, inter alia, on the angle at which the incompressible fluid is injected into the compressible feed stream, the velocity of the incompressible fluid exiting the incompressible fluid injection nozzle(s), the velocity of the compressible feed stream, and the relative flow rates of the incompressible fluid stream and the compressible feed stream.

While not intending to be limited by theory, the rotational motion of the mixed stream in the separation section induces a centrifugal force that results in the separation of the incompressible fluid and any compressible target components absorbed therein from the compressible components within the mixed stream. The incompressible fluid, along with the compressible target components absorbed therein, is separated from the compressible components of the mixed stream that are not absorbed into the incompressible fluid due to inertial effects and the large density difference between the incompressible fluid and the compressible components not absorbed in the incompressible fluid. Centrifugal force also acts on the compressible components so that a pressure gradient is created and is represented for a component i by equation 1.

$$P_i(r) = P_i(0)\exp(A_i r^2) \qquad \text{(Eq. 1)}$$

where Pi is the partial pressure of component i (MPa), Pi(0) is the initial pressure at the center of the device, and r is the radial coordinate in meters (m). The coefficient $A_i$ is defined according to equation 2.

$$A_i = (MW_i^2)/(2RT) \qquad \text{(Eq. 2)}$$

where $MW_i$ is the molecular weight of component i, $\Omega$ is the angular velocity, R is the gas constant, and T is the temperature. This relationship demonstrates how the pressure changes as a function of radius. The coefficient $A_i$ increases at higher speeds and for compressible components with higher molecular weights.

The mixed stream 202 & 208 in the separation device 204 passes through the swirl inducing structure 218 causing the mixed stream to rotate through the remainder of the separation device. The swirl inducing structure generally maintains the flow regime of the entering compressible feed stream or mixed stream. For example, given a supersonic linear velocity of the compressible components passing through the swirl inducing structure, the compressible component velocity would retain a supersonic linear velocity. For an incompressible fluid or compressible components entering the swirl inducing structure with a subsonic linear velocity, the linear component of the velocity would generally remain subsonic. As described above, however, the swirl inducing structure may be configured to increase the linear velocity of the compressible components and/or the incompressible fluid, preferably without changing the flow regime of the compressible components and/or incompressible fluid.

While not intending to be limited by theory, it is believed that a high rate of mass transfer of the compressible target component(s) between the compressible feed stream and the incompressible fluid takes place in the swirl inducing structure. As the mixed stream passes through the swirl inducing structure, intimate mixing is achieved between the incompressible fluid droplets and the compressible components from the compressible feed stream. The mass transfer rate between the incompressible fluid droplets and the compressible components will be proportional to the surface area of the droplets. As such, smaller droplets will tend to show greater mass transfer rates within the swirl inducing structure. The fluid mixture leaving the swirl inducing structure should be at or near equilibrium between the incompressible fluid droplets and the compressible target component from the compressible feed stream. The removal of the droplets in the downstream separation section then removes the compressible target component from the compressible non-target components of the compressible feed stream.

The separation device has a separation section 220 for removing any incompressible fluid or the majority of the incompressible fluid contained in the mixed stream. As described above, removing an incompressible fluid or a portion thereof from the mixed stream separates a constituent from the mixed stream, where the constituent is selected from the group consisting of a mixture of a first compressible (target) component from the compressible feed stream and the incompressible fluid, a product or an adduct of a reaction between the first compressible component and the incompressible fluid, and mixtures thereof.

The separation section may include structures for the extraction of particles and the incompressible fluid from the mixed stream. Various structures and arrangements may be utilized for extracting particles and the incompressible fluid from the mixed stream while maintaining the fluid flow through the separation device. In an embodiment, an inner conduit 222 having openings or passages disposed therein may be disposed within an outer conduit 224. The inner conduit has a geometry that can be chosen so as to determine the flow pattern within the separation device, as described in more detail below. In the separation section, the heavier components, which include the incompressible fluid along with the compressible target component, solid particulates, if any, and heavier compressible components, may move radially outward towards the inner surface of the inner conduit 222. Upon contacting the conduit, the incompressible fluid may form a film on the inner surface of the conduit and migrate through the openings in the inner conduit to the annular space 226 between the inner conduit 222 and the outer conduit 224. In an embodiment, the size of the openings may be selected such that an incompressible fluid film forms on the inner surface of the inner conduit so as to prevent any compressible component within the separation section, other than one absorbed by the incompressible fluid, from passing to the annular space between the inner and outer conduits. As a further absorption mechanism, the build up of the heavier gas components along the inner surface of the inner conduit may increase the concentration of the heavier compressible components in contact with the incompressible fluid. If the heavier compressible components are soluble in the incompressible fluid or may react with the incompressible fluid, additional absorption may occur due to the higher partial pressure of the heavier compressible components in contact with the incompressible fluid. The incompressible fluid containing the target component and solid particulates, if any, then migrates through the openings in the inner conduit and builds up in the annular space for removal through one or more drain ports 230.

In an embodiment, the annular space may contain partitions to allow for the removal of the incompressible fluids from specific subsections of the separation section. For example, the annular space may be partitioned into a plurality of subsections, each containing a dedicated drain port. Such a configuration may allow the removal of any solids in the section nearest the inlet, followed by the incompressible fluid enriched in heavier compressible components, and finally followed by the incompressible fluid enriched in lighter gases (e.g., $CO_2$, $SO_2$). The addition of individual drain ports for each subsection allows for separate processing of these streams to optimize the target component recovery while minimizing the energy consumption of the process.

In another embodiment, one or more incompressible fluid nozzles may be disposed within the separation section. Such an arrangement may be useful in combination with partitions within the annular space. In this embodiment, an incompressible fluid may be injected and then removed prior to injection of additional incompressible fluid in the downstream direction. The injected incompressible fluid may be the same in each instance or it can be different. Thus, specific components can be targeted throughout the separation section using different incompressible fluids with discrete drain ports removing the injected incompressible fluid from each section.

In an embodiment, the geometry of the separation section may take a variety of shapes. In general, higher rotational velocities result in better separation of the incompressible fluid. Thus, a separation section with a converging profile can result in a higher separation efficiency but a diverging section may have greater pressure recovery for the first compressible product stream. A cylindrical section balances separation efficiency and pressure recovery by maintaining the rotational and linear velocities, which may decrease through the separation section due to drag forces.

As shown in FIG. 2, the flow of the mixed stream through the separation section may take place within an inner conduit comprising a converging flow profile (i.e., the diameter of the gas flow channel in the separation section decreases along the flow axis in the direction of flow). In this configuration, the linear velocity component of the mixed stream and its components may generally increase with the decrease in the radius of the inner conduit. In some embodiments, the linear velocity may decrease in this configuration due, at least in part, to the absorption of the target component in the incompressible fluid resulting in an overall decrease in the volumetric flowrate. Where the linear velocity component of the mixed stream decreases and the rotational velocity component remains the same (or decreases to a smaller degree), the swirl ratio defined as $V_{rotational}/V_{linear}$ increases. An increase in the swirl ratio can enhance or enforce the centrifugal force of the separation, thus increasing the removal efficiency of particles of small diameter from the mixed stream.

In another embodiment, the separation section may have a diverging flow profile within the inner conduit in the separation section. As a fluid flow phenomena, when a fluid with a subsonic velocity passes through a conduit with an increasing diameter, the linear velocity will decrease. However, when a fluid at supersonic flow (Mach number>1) enters a diverging conduit, the linear velocity will increase. This process may be used to generate a mixed stream flow, or a flow of at least the compressible components of the mixed stream, through the separation device with a supersonic velocity, which may be desired in some embodiments.

In an embodiment, the conduit may maintain a constant diameter throughout the separation section. The resulting velocity profile of the mixed stream should remain the same or nearly the same throughout the separation section until the compressible components of the mixed stream that are not absorbed by the incompressible fluid approach the diffuser 228, where the non-absorbed compressible components may undergo a decrease in velocity.

Although the linear velocity of the mixed stream, including the second (non-target) compressible component from the compressible feed stream, may decrease through the separation section depending on the configuration of the separation section, the linear velocity of the second compressible component is increased at some point in the process relative to the initial linear velocity of the second compressible component in the compressible feed stream. The linear velocity of the second compressible component may be increased relative to the initial linear velocity of the second compressible component in the compressible feed stream by momentum transfer imparted by mixing the incompressible fluid stream with the compressible feed stream in a substantially co-current flow to form the mixed stream and/or by passing through the swirl inducing structure. Furthermore, although the linear velocity of the second compressible component of the compressible feed stream may be increased upon mixing with the incompressible fluid stream and/or by passing through the swirl inducing device, the linear velocity of the mixed stream, including the second compressible component, may decrease in the separation section, and the overall linear velocity of the second compressible component from the compressible feed stream may decrease relative to the initial linear velocity of the second compressible component in the compressible feed stream depending on the configuration of the separation section.

Selection of the shape of the separation section depends on the properties of the target component(s), the conditions of the compressible feed stream, the concentrations of the components in the compressible feed stream and desired in the product streams, the type of incompressible fluid used, and the expected rotational rate of the mixed stream flowing through the separator. For example, a diverging flow profile may be used to increase or maintain a supersonic compressible component velocity through the separation section. Such a design may modify the fluid conditions to improve solubility of the component or components to be separated in the incompressible fluid. For example, if carbon dioxide is to be removed from a compressible feed stream, the separation section design may be chosen so that the fluid conditions result in the liquification or near liquification of carbon dioxide at the inner surface of the inner conduit. Such an embodiment should increase the carbon dioxide loading in the incompressible fluid. Other effects may be achieved based on thermodynamic considerations.

In an embodiment, a diffuser is used to decelerate the compressible product stream passing through the inner conduit once the incompressible fluid, including the compressible target components, and any other incompressible components have been removed. A diffuser generally has a divergent shape, which may be designed based on the expected flow regime of the compressible product stream passing through the inner conduit. If a supersonic compressible product stream velocity is expected through the inner conduit, the diffuser may be designed to establish a controlled shock wave. For other flow velocities, the diffuser may be used to return the compressible product stream to a primarily linear velocity with a corresponding increase in pressure for use in downstream processes. In general, the pressure of the compressible product stream passing through the inner conduit will increase upon passing through the diffuser.

In an embodiment, other equipment can be included downstream of the separator device to further process the first compressible product stream 206. For example, further incompressible fluid removal equipment may be used to remove any entrained incompressible fluid droplets in the first compressible product stream that are not separated in the separation section of the separation device. For example, a polishing device that induces a change in the direction of flow of the first compressible product stream can be used to cause the entrained incompressible fluid to impinge on a surface and coalesce for collection. Suitable polishing devices can include, but are not limited to, a vane type separator, and a mesh type demister. Additional further incompressible fluid removal equipment can include, but is not limited to, membrane separators. In an embodiment, a heat exchanger is used to cool the first compressible product stream and induce condensation of any incompressible fluids entrained in the first compressible product stream prior to the first compressible product stream entering the incompressible fluid removal equipment.

[[[Solvent Recovery and Regeneration (Other Equipment)]]]

In an embodiment, an incompressible fluid recovery process may be used to regenerate the incompressible fluid for reuse within the process and to recover one or more second compressible product streams. Referring to FIG. 2, the incompressible fluid product stream 212 leaving the drain port 230 contains the incompressible fluid removed from the separation device 204 along with at least one target component. In order to regenerate the incompressible fluid for recycle to the incompressible fluid inlet to the separation device (e.g. nozzle 209), the incompressible fluid is regenerated using a incompressible fluid separation device 210. The incompressible fluid separation device may be any device capable of separating at least some of the target component from the incompressible fluid product stream. The design of the incompressible fluid separation device will depend on the target component composition, the type of incompressible fluid used in the separation device, and the loading of the target component in the incompressible fluid.

In an embodiment in which the incompressible fluid is a physical solvent such as methanol, a simple separation device comprising a stripping vessel, a flash tank, or a distillation column (e.g., a selective distillation column) may be used to remove the target component from the incompressible fluid product stream. Such a separation device may function by heating the target component rich incompressible fluid product stream (e.g., temperature swing separation) or reducing the pressure of the target component rich incompressible fluid product stream (e.g., pressure swing separation), thus reducing the target component solubility in the incompressible fluid. In some embodiments, steam or another suitable heat source may be used in a direct heat transfer system to increase the temperature of the incompressible fluid product stream. The target component can be separated as a second compressible product stream in the gas phase through an overhead stream 214 and passed on to further downstream processes.

The target component-depleted incompressible fluid (the "regenerated" incompressible fluid) may be passed back to the incompressible fluid injection nozzle 209 at the inlet of the separation device. In an embodiment, a separation device and process as described herein may be used to separate the target component from the incompressible fluid product stream, as described in more detail below. The incompressible fluid removed from the incompressible fluid separation device 210 may contain some of the target component when recycled to the incompressible fluid injection device, depending on the conditions of the incompressible fluid separation device. Such minor amounts can be expected based on the design of the system and should not affect the removal efficiency of the overall separation method described herein.

In an embodiment in which the incompressible fluid is a chemical solvent, the incompressible fluid separation device may incorporate a heating source for breaking any chemical compounds or adducts that are formed between the original incompressible fluid and the target component(s). For example, a reactive distillation scheme can be used to remove the target component(s) from the incompressible fluid product stream. The heating source can be any direct or indirect heat source, for example steam. If direct heating is used, the heating source (e.g., steam) may pass out of the incompressible fluid separation device along with the target component and be removed in a flash tank downstream. Water separated in this fashion may be discarded or it can be recycled to a boiler or other heating source for reuse within the process. In an embodiment, a separation device and process as described herein may be used to separate the target component from the incompressible fluid product stream, as described in more detail below.

Figure 6:
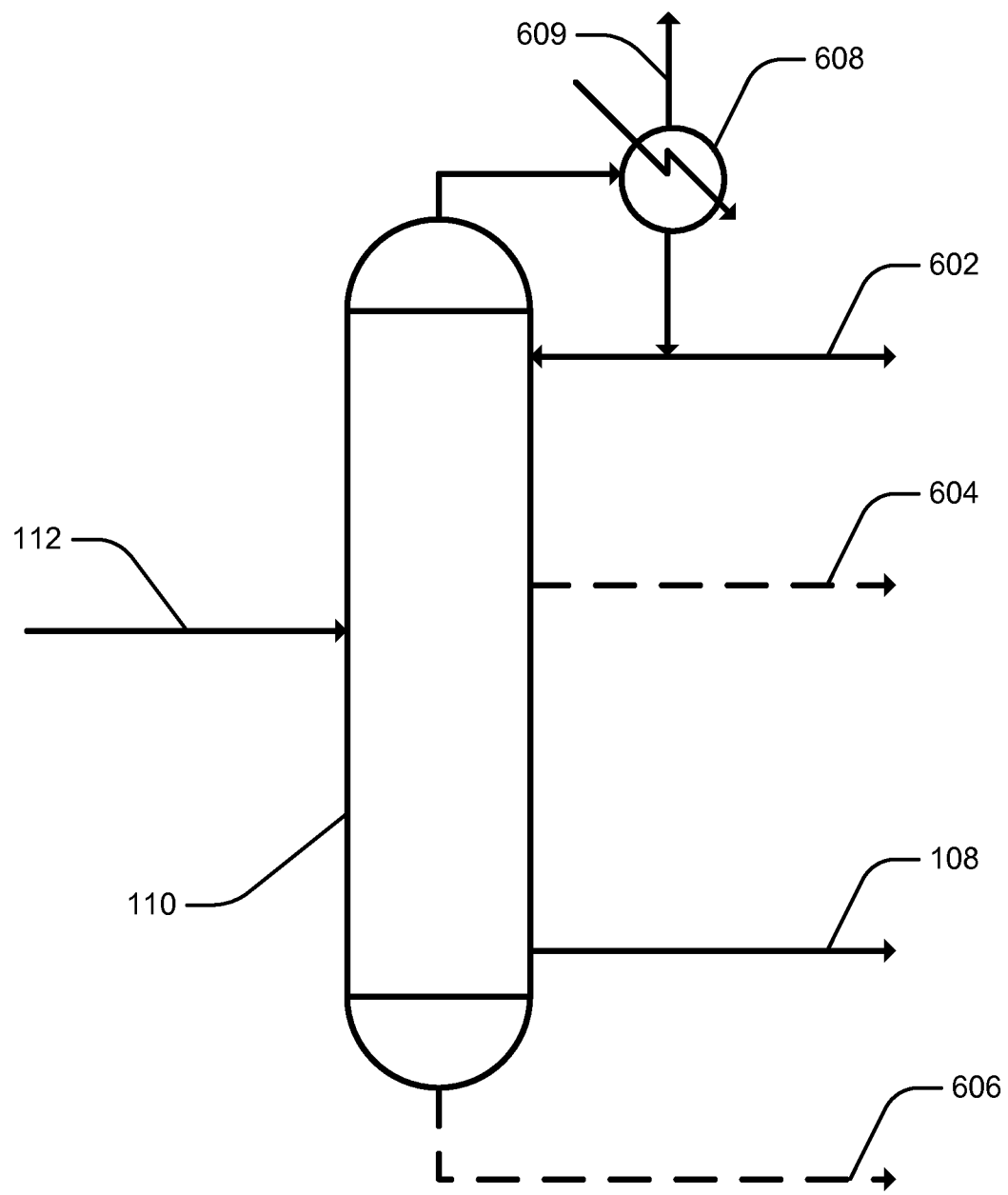
FIG. 6 schematically illustrates an embodiment of an incompressible fluid separation device.

In an embodiment shown in FIG. 6, the incompressible fluid product stream 112 leaving the drain port contains the incompressible fluid removed from the separation device (e.g. 202 in FIG. 2) along with at least one target component. The incompressible fluid separation device 110 comprises any suitable separation device such as a fractional distillation column containing multiple trays or plates to allow for vapor-liquid equilibrium. In this embodiment, the incompressible fluid product stream 112 is heated to separate the compressible component in the gas phase. A condenser 608 cools the compressible component and results in a second compressible product stream 609 and a liquid product stream 602, a portion of which is returned to the incompressible fluid separation device to allow for proper separation of the components in the separation device 110. The incompressible fluid with at least a portion of the compressible component removed is removed from the bottom of the column as a liquid stream 108. Other optional outlet streams can leave the incompressible fluid separation device 110 as liquid streams 604, 606. For example, any water present in the incompressible fluid product stream 112 entering the incompressible fluid separation device 110 can optionally be removed as a liquid stream 606 for further use within the process as desired. As another example, a liquid sulfur dioxide stream can be removed from the incompressible fluid separation device for sale or further use using an outlet stream such as stream 604. The incompressible fluid separation device 110 can be operated at a temperature and pressure sufficient to generate liquid outlet streams. One of ordinary skill in the art with the benefit of this disclosure would know the conditions to generate liquid outlet streams.

[[[Specific Embodiments]]]

Figure 4:
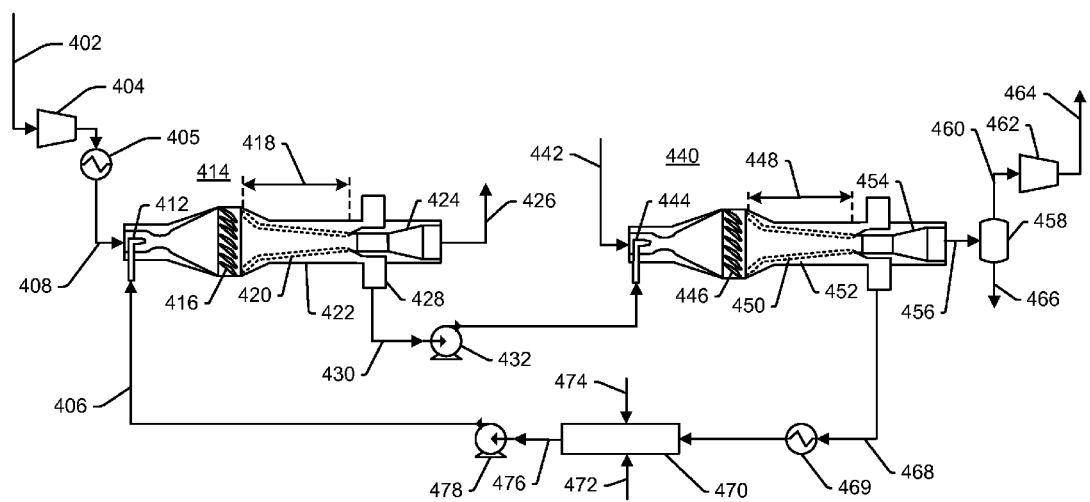
FIG. 4 schematically illustrates still another embodiment of a separation process of the invention.

An embodiment of the process and device is schematically shown in FIG. 4. In this embodiment, the incompressible fluid regeneration device is a centrifugal separation device. In this embodiment, a compressible feed stream 402, which is a combustion gas stream that may be a flue gas stream for example, is first passed through a compressor 404 before being cooled in a heat exchanger 405. The compressible feed stream 402 may be compressed to a pressure ranging from 2 bar (0.2 MPa) to 200 bar (20 MPa). In an embodiment, the compressible feed stream 402 temperature is cooled to near the freezing point of the incompressible fluid selected to separate one or more compressible target components from the compressible feed stream to increase the solubility of the target component(s) in the incompressible fluid stream.

The compressed and cooled compressible feed stream 408 is fed into the separation device 414. The compressed, cooled compressible feed stream 408 is combined with an incompressible fluid stream 406 comprised of an incompressible fluid to form a mixed stream by, for example, passing the incompressible fluid stream 406 through a nozzle 412 to produce droplets and injecting the droplets into the compressible feed stream. This mixing is preferably, but not necessarily, effected within the separation device. The resulting mixed stream is passed through a throat section either before or after passing over a swirl inducing structure 416 that imparts a rotational velocity component to the mixed stream. The mixing of the incompressible fluid droplets with the compressible feed stream in the swirl inducing structure may enhance the transfer of one or more compressible target components from the compressible feed stream into the incompressible fluid. The velocity of the combined mixture is determined by the design of the separation device and the entering stream properties. The compressible feed stream is at subsonic, transonic, or supersonic velocity while the incompressible fluid stream is at subsonic velocity, as desired.

In an embodiment, the resulting swirling mixed stream then passes into a separation section 418 of the separation device 414. The separation section 418 has an inner conduit 420 with openings to allow fluid communication with the annular space between the inner conduit 420 and an outer conduit 422. The incompressible fluid droplets containing the compressible target component(s) are separated due to the centrifugal force of the swirling flow of the mixed stream in the separation section. The incompressible fluid droplets impinge on the inner surface of the inner conduit 420 to form an incompressible fluid film. A compressible component stream from which the incompressible fluid and at least a portion of the compressible target component(s) have been separated then exits the separation section 418 and enters a diffuser section 424 before exiting the separation device 414 as a first compressible product stream 426.

The incompressible fluid in which at least a portion of the compressible target component has been absorbed that is separated from the mixed stream in the separation section 418 of the separation device 414 collects in the annular space between the inner conduit 420 and the outer conduit 422 before being removed through a drain port 428. The flow rate of the incompressible fluid out of the separation device 414 through the drain port 428 may be controlled so that an incompressible fluid film is maintained on the inner surface of the inner conduit 420. The incompressible fluid film inhibits the compressible components in the mixed stream from passing through the openings in the inner conduit 420 and passing out of the process through the drain port 428 unless the compressible component(s) are target components absorbed in the incompressible fluid. The resulting target component-rich incompressible fluid product stream 430 then passes to an incompressible fluid regeneration system. A pump 432 may be supplied to increase the pressure of the target component-rich incompressible product fluid for supply to the incompressible fluid regeneration system.

In the embodiment shown in FIG. 4, the incompressible fluid regeneration system comprises a centrifugal force separator 440. The target component-rich incompressible fluid product stream 430 is supplied to the centrifugal force separator 440. A steam feed 442 is fed to the centrifugal force separator 440 to provide direct heating of the target component-rich incompressible fluid product stream. The steam feed 442 is combined with the target component-rich incompressible fluid of the incompressible fluid product stream using any known means of combining a liquid stream with a gas. For example, the target component-rich incompressible fluid product stream 430 may be passed through a nozzle 444 to produce a microdroplet mist which may be mixed with the steam feed 442 to form a mixed stream. The resulting mixture then passes through a throat section either before or after passing over a swirl inducing structure 446 for imparting a rotational velocity component to the mixed stream. The mixing of the target component-rich incompressible fluid droplets with the steam, enhanced by the swirl inducing structure, may result in one or more target components being transferred from the target component-rich incompressible fluid product stream into the compressible gaseous steam. The velocity of the combined mixture is determined by the design of the separation device and the entering stream properties. The compressible portion of the mixed stream is at subsonic, transonic, or supersonic velocity as desired.

The resulting swirling mixed stream then passes into a separation section 448 of the separation device 440. The separation section 448 has an inner conduit 450 with openings to allow fluid communication with the annular space between the inner conduit 450 and an outer conduit 452. Incompressible fluid droplets are separated from compressible components in the mixed stream due to the centrifugal force of the swirling fluid flow in the separation section. The incompressible fluid droplets impinge on the inner surface of the inner conduit 450 to form an incompressible fluid film. A compressible target component product stream containing one or more target components from which the incompressible fluid is separated exits the separation section 448 and enters a diffuser section 454 before exiting the separation device 440 as a crude compressible target component stream 456. The crude compressible target component stream 456 may be passed to a separation device 458, for example, a flash tank or distillation column, to condense any water present in the crude compressible target component stream. The separation device 458 produces a polished compressible target component stream which is the second compressible product stream 460 comprising the target component(s) separated from the compressible feed stream. In an embodiment, the second compressible product stream passes through a compressor 462 to raise the pressure of the second compressible product stream 464 before being passed downstream for other uses. The separation device 458 also produces an incompressible fluid stream comprising the water from the steam injected into the incompressible fluid regeneration device 440. In an embodiment, the water is recycled to form the steam that is injected into the separation device or otherwise used in the process.

In an embodiment, the incompressible fluid separated from the compressible target component product stream in the separation device 440 comprises a lean incompressible fluid stream 468 for recycle to the inlet of the process. In an embodiment, additional water 474 and make-up incompressible fluid 472 are added in a mixing vessel 470, as required. The lean incompressible fluid may pass through heat exchanger 469 to adjust the lean incompressible fluid temperature to the desired temperature of the makeup incompressible fluid. The resulting lean incompressible fluid mixture 476 passes through a pump 478 to increase pressure for injection into the separation device through the incompressible fluid injection nozzle 412. In an embodiment, the process is repeated to further remove one or more components from the compressible feed stream.

Figure 5:
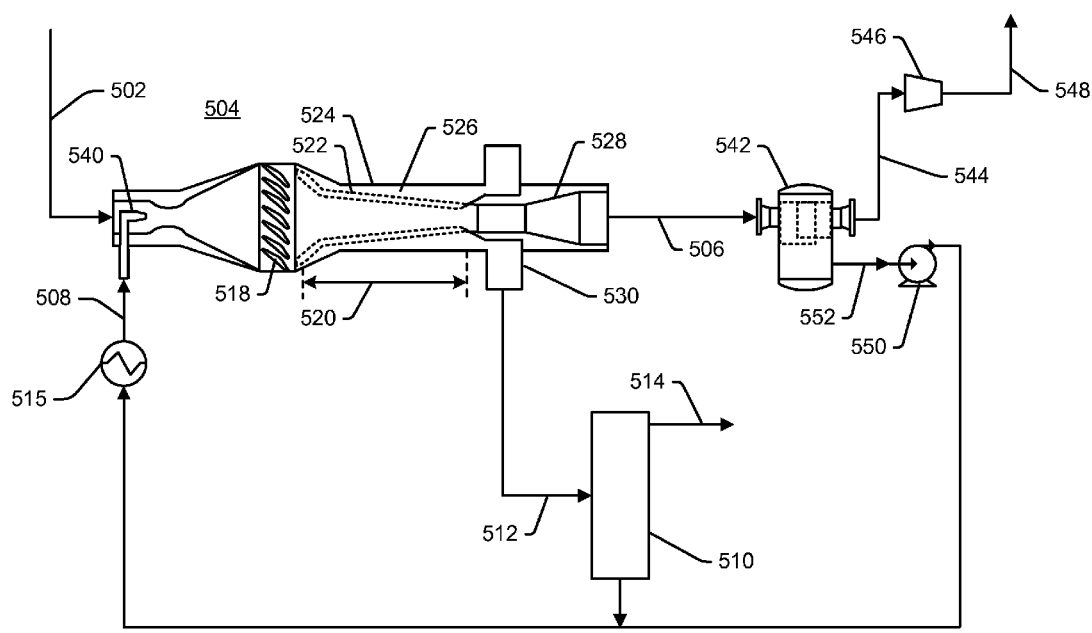
FIG. 5 schematically illustrates yet another embodiment of a separation process of the invention.

FIG. 5 schematically illustrates another embodiment of a separation process and system for removing one or more components from a compressible feed stream using an incompressible fluid. This embodiment is similar to the embodiment shown in FIG. 2. In this embodiment, a compressible feed stream 502, which is a combustion gas stream that may be a flue gas stream for example, is at a pressure ranging from 2 bar (0.2 MPa) to 200 bar (20 MPa). The compressible feed stream may optionally be passed through a compressor (not shown in FIG. 5) prior to entering the separation device to raise the pressure as necessary. The compressible feed stream 502 is fed to the separation device 504. The compressible feed stream 502 is combined with an incompressible fluid stream 508 comprising an incompressible fluid by, for example, passing the incompressible fluid through a nozzle 540 to produce incompressible fluid droplets and mixing the incompressible fluid droplets with the compressible feed stream. This mixing is preferably, but not necessarily, effected within the separation device. The resulting mixed stream may then pass through a throat section either before or after passing over a swirl inducing structure 518 for imparting a rotational velocity component to the mixed stream and its components. The mixing of the incompressible fluid droplets with the compressible feed stream, enhanced by the swirl inducing structure, results in one or more compressible target components being transferred from the compressible feed stream into the incompressible fluid. The velocity of the mixed stream is determined by the design of the separation device and the entering stream properties.

The resulting swirling mixed stream is then passed into a separation section 520 of the separation device 504. The separation section has an inner conduit 522 with openings to allow fluid communication with the annular space 526 between the inner conduit 522 and an outer conduit 524. Target component-enriched incompressible fluid droplets may be separated from the mixed stream due to the centrifugal force of the swirling flow of the mixed stream in the separation section. The target component enriched incompressible fluid droplets impinge on the inner surface of the inner conduit 522 to form an incompressible fluid film. A compressible product stream formed by separation of the incompressible fluid from the mixed stream then exits the separation section 520 and enters a diffuser section 528 before exiting the separation device 504 as a first compressible product stream 506.

In an embodiment, the first compressible product stream 506 passes through an additional incompressible fluid separator 542 to remove any remaining incompressible fluid entrained in the first compressible product stream 506 and form a polished first compressible product stream 544. In an embodiment, the incompressible fluid separator comprises any device capable of removing an incompressible fluid from the first compressible product stream. For example, incompressible fluid separators can include, but are not limited to, vane separators, settling tanks, membranes, and mesh type demisters. The resulting polished first compressible product stream 544 may be passed to a compressor 546. As the polished first compressible product stream 544 passes through the compressor 546 the pressure of the resulting compressible stream 544 may be increased. The incompressible fluid 552 removed from the first compressible product stream 506 in the incompressible fluid separator 542 may be combined with regenerated incompressible fluid from the incompressible fluid regenerator device 510. In an embodiment, the incompressible fluid stream 552 passes through a pump 550 to provide the driving force to move the incompressible fluid through the associated piping.

The target component-rich incompressible fluid separated from the compressible product stream in the separation section 520 of the separation device 504 collects in the annular space 526 between the inner conduit 522 and the outer conduit 524 before being removed through a drain port 530. The flow rate of the target component-rich incompressible fluid out of the separation device 504 through the drain port 530 may be controlled so that an incompressible fluid film is maintained on the inner surface of the inner conduit 522. The incompressible fluid film inhibits the compressible components in the mixed stream that are not absorbed by the incompressible fluid from passing through the openings in the inner conduit 522 and passing out of the process through the drain port 530. The target component-rich incompressible fluid stream 512 removed from the separation device may pass to a incompressible fluid regeneration device 510 for separation of the target components from the incompressible fluid and for regeneration of the incompressible fluid. Once the incompressible fluid is regenerated, it may be recycled for re-use in the separation device 504. In an embodiment, the recycled incompressible fluid can be passed through a heat exchanger 515 to provide an incompressible fluid at a desired temperature to the separation device 504. In another embodiment, the incompressible fluid 508 used at the inlet of the separation device 504 is fresh incompressible fluid.

The incompressible fluid regeneration device 510 removes the target component or components absorbed in the incompressible fluid of the incompressible fluid product stream 512 as a second compressible product stream 514. The second compressible product stream 514 exits the incompressible fluid regeneration device 510 for utilization in any of the end uses of the products discussed herein.

[[[Energy Balance Description]]]

In an embodiment, the present invention provides a process and device for separating a compressible target component from a compressible feed stream with a lower energy input requirement than conventional separation processes. Specifically, the use of a separation process as described herein utilizes less energy to separate a compressible component from a combustion gas stream stream containing at least two compressible components, such as a flue gas stream, than conventional processes, for example, distillation units, stripping columns, amine processes, cyclones, and membrane separation units.

In calculating an energy consumption around any separation process, several forms of energy are taken into account. In general, an energy consumption calculation accounts for heat flow in or out of a system or unit, shaft work on or by the system, flow work on or by the system that may be taken into account through a calculation of the change in enthalpy of all of the streams entering or leaving a system, and changes in the kinetic and potential energy of the streams associated with a system. The energy balance will generally take into account the energy required by each unit in the system separately unless the energy flows of a unit are tied to another unit, for example, in a heat integration scheme. When comparing two processes, any difference in the enthalpy of entering streams (e.g., due to differences in temperature or pressure) can be calculated and taken into account in the energy consumption calculation during the comparison. In addition, a comparison between various systems should take into account all process units involving any stream between the inlet measurement point and the outlet measurement points. Any use of any stream or portion of a stream as fuel for the system should be taken into account in the energy consumption calculation. In an embodiment, a process simulator or actual process data may be used to calculate the energy requirements of each unit of a specific process. Common measures of energy consumption from process calculations include heating and cooling loads, steam supply requirements, and electrical supply requirements.

As a common measurement location, an energy consumption calculation should take into account a feed stream immediately prior to entering the separation process. The product streams should be measured at the first point at which each product stream is created in its final form. For example, in FIG. 2, the feed stream 202 would be measured immediately prior to entering the separation device 204 and being combined with the incompressible fluid 208. The first compressible product stream 206 would be measured immediately upon exiting the separation device 204, which would be just downstream of the diffuser 228. The second compressible product stream would be measured at the first point at which the separated target component stream is removed from the incompressible fluid. This would be just downstream (e.g., at the exit) of the incompressible fluid regeneration device 210.

Other separation processes have similar stream locations that define the boundary of which units are included in an energy balance. For example, a distillation column would have an inlet stream that would be measured just prior to entering the distillation column. The overhead outlet stream and the bottoms outlet stream would represent the two outlet stream measurement points. All of the units in between the these three points would be considered in the energy consumption calculation. For example, any reboilers, condensers, side stream units, side stream rectifiers, or other units found in the distillation sequence would be considered.

Figure 3:
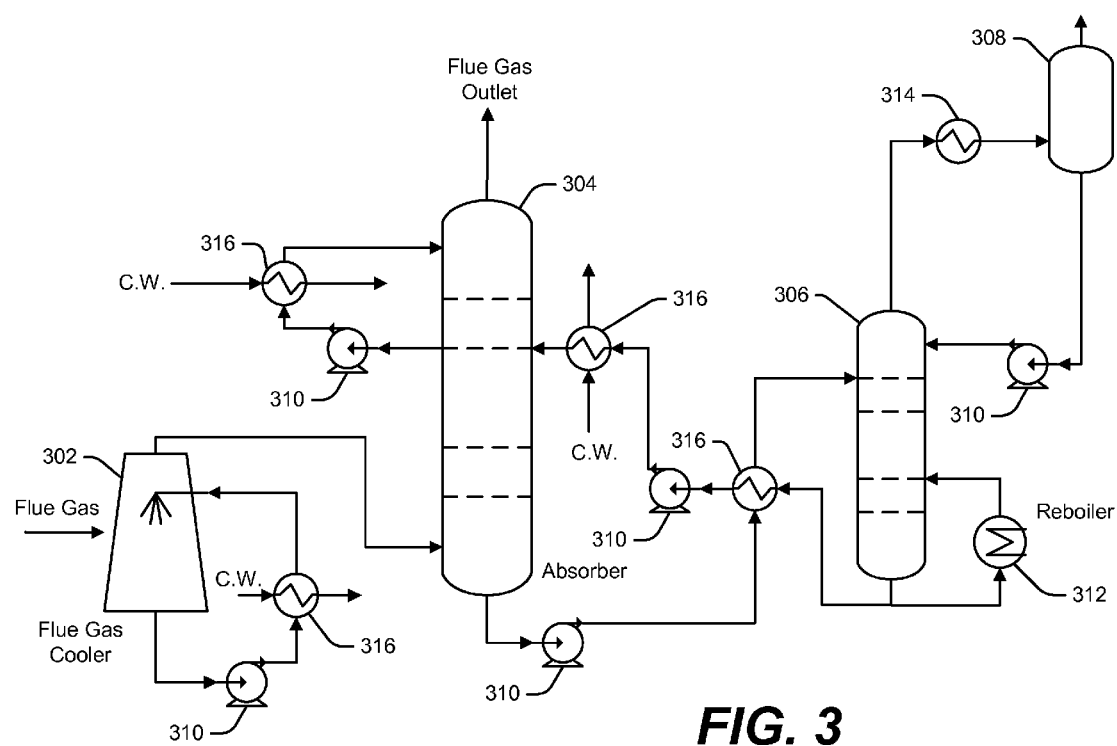
FIG. 3 schematically illustrates an embodiment of a conventional amine process.

As a comparative example, a conventional amine plant as shown in FIG. 3 would have the inlet stream measured immediately prior to the inlet gas stream entering the flue gas cooler 302. The first outlet stream (e.g., the clean gas stream) would be measured at the exit of the absorber tower 304 and the second outlet stream would be measured as the overhead outlet stream of the incompressible fluid regeneration column 306. All of the units commonly found in an amine separation plant would be considered in the energy consumption calculation. For example, units including flash tanks 308, pumps 310, reboilers 312, condensers 314, heat exchangers 316, and any other additional process units would be included in the energy consumption calculation.

Conventional processes for separating a compressible component from a combustion gas compressible feed stream may consume a greater amount of energy than the process described herein. In an embodiment of the process in which the feed stream comprises a flue gas, the energy consumption of the system is less than 1,200 Btu/lb-component removed, 1,000 Btu/lb-component removed, or alternatively, less than 800 Btu/lb-component removed.

[[[Pressure Effects Within the Separator]]]

The use of the separation process and device of the present invention can be described in terms of the pressure differentials between the feed and compressible product streams. As a common measurement location, the compressible feed stream pressure may be measured near the compressible feed stream inlet to the separation device. In an embodiment in which an expander is used prior to the separation device and a compressor is used after the separation device, each of which may share a common shaft, the compressible feed stream pressure may be measured near the inlet of the expander. The compressible product streams should be measured at the first point at which the product stream is created in its final form. For example, in FIG. 2, the compressible feed stream 202 pressure would be measured near the entrance to the separation device 204 prior to the compressible feed stream being combined with the incompressible fluid 208. The first compressible product stream 206 would be measured near the exit of the separation device 204, which would be just downstream of the diffuser 228. The second compressible product stream would be measured at the first point at which the separated target component stream is removed from the incompressible fluid. This would be just downstream (e.g., near the exit) of the incompressible fluid regeneration device 210. In an embodiment in which the second compressible product stream leaves the incompressible fluid regenerator, and thus the overall separation process, as a liquid, the pressure of the second product stream can be measured at the point at which the compressible component is compressible within the incompressible fluid separation device. For example, the equilibrium vapor pressure at the point in the separation device at which the compressible component is a gas or vapor can be used to measure the second compressible product stream pressure. For example, the conditions above a tray in the column can be taken as the common measurement location in this embodiment. This point may also be used for the energy balance described herein.

In an embodiment of the invention, the pressure differentials between the feed and compressible product streams will be less than conventional separation processes. This is advantageous because it avoids or minimizes the need to repressurize the compressible product streams for the next use or application. In an embodiment, the compressible feed stream pressure will be within 50% of each compressible product stream pressure. In another embodiment, the compressible feed stream pressure will be within 40% of each compressible product stream pressure. In an embodiment, the compressible product stream pressures will be within 20% of one another. For example, in an embodiment with two compressible product streams, the pressure of the first compressible product stream will be within 20% of the second compressible product stream pressure. In another embodiment, the compressible product stream pressures may be within 15% of one another.

[[[End Uses of Output Streams]]]

The compressible product streams produced by the method and device of the present invention may be used for a variety of purposes. In an embodiment, two or more compressible product streams are produced. The first includes the components of the compressible feed stream that pass through the diffuser of the separation device. The second includes the target component or components that are removed from the compressible feed stream. Each stream may be used for further downstream uses depending on the stream composition and properties.

In an embodiment in which the compressible feed stream is a flue gas stream, the compressible product streams may comprise a combustion products stream, and one or more streams comprising carbon monoxide, carbon dioxide, sulfur dioxide, nitrogen oxides, and/or organic compounds. The combustion products stream may comprise primarily nitrogen and oxygen, and optionally the water vapor in the flue gas stream may also be present. The combustion products stream can be vented to the atmosphere, compressed and sold as an enriched nitrogen stream, or otherwise used. Any carbon monoxide remaining in the product stream can be subjected to further processing to produce carbon dioxide. Exemplary processes for converting carbon monoxide to carbon dioxide include, but are not limited to, partial oxidation, catalytic reduction, and a gas-shift reaction.

The compressible components separated from the flue gas stream may be disposed of or used for any another suitable purpose. For example, the carbon dioxide separated from the flue gas stream may be reinjected into a subterranean formation for disposal, or it may be selectively injected in a subterranean formation as part of an enhanced oil recovery program. For example, the carbon dioxide may be reinjected as part of a miscible flooding program in a hydrocarbon producing field. When reinjected, carbon dioxide forms a miscible solvent for the dissolution of hydrocarbons. The resulting mixture has a lower viscosity and can be more easily removed from a subterranean formation. In another embodiment, carbon dioxide may be injected at or near the bottom or a reservoir to produce a driving force for the production of the remaining hydrocarbons in the reservoir. Some portion of the carbon dioxide will be removed with the hydrocarbons produced from the formation. Thus a recycle type enhanced oil recovery program may be created using the system and method of the present invention to separate the carbon dioxide from the produced hydrocarbons and reinject them into the formation.

In an embodiment, the separated carbon dioxide is injected into a deep aquifer. The solubility of the contaminates allows the absorption of the contaminates in the water within the aquifer, thus storing the contaminates.

The remaining components that can be separated may be likewise disposed of or utilized in downstream processes. In an embodiment in which the sulfur compounds are removed from the flue gas stream, the sulfur may be reduced to elemental sulfur, which can be sold or utilized in various industrial processes that utilize sulfur. In another embodiment, a liquid sulfur dioxide stream can be produced by the separation process and sold as a commodity chemical. In still another embodiment, the sulfur can be converted to a mineral for disposal. For example, lime or limestone can be used to form calcium sulfite or calcium sulfate which can be disposed in a variety of known methods. Various processes are also known for converting sulfur dioxide to sulfuric acid, which a commodity chemical with uses known to one of ordinary skill in the art.

Similarly for nitrogen oxides, any separated nitrogen oxide can be treated to form elemental nitrogen and water by, for example, contacting the nitrogen oxides with ammonia or urea in a selective catalytic reduction process. Suitable methods are known for converting the nitrogen oxides to nitric acid, which can be used in various industrial processes.

In an embodiment in which additional components are removed from the flue gas stream, these components may be disposed of using known techniques. For example, if heavy metals (e.g., mercury) are removed from the process, the compounds can be disposed of in a proper manner or the metals can be reduced to elemental metals for sale or use in various processes.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present invention. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an", as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

What is claimed is:

1. A method comprising:
providing a compressible feed stream comprised of a first compressible component and a second compressible component, where the compressible feed stream is derived from a combustion source;
providing an incompressible fluid stream comprised of an incompressible fluid capable of absorbing the first compressible component or reversibly reacting with the first compressible component;
mixing the compressible feed stream and the incompressible fluid stream to form a mixed stream, where the compressible feed stream is provided for mixing at a first linear velocity in a first direction and the incompressible fluid stream is provided for mixing at a second linear velocity in a second direction, the second linear velocity having a velocity component in the same direction as the first direction, where the mixed stream has an instantaneous third linear velocity in a third direction and is comprised of the second compressible component and a constituent selected from the group consisting of a mixture of the first compressible component and the incompressible fluid, a chemical compound or adduct of a reversible reaction between the first compressible component and the incompressible fluid, and mixtures thereof;
imparting a rotational velocity to the mixed stream, where the rotational velocity is tangential or skew to the direction of the instantaneous third linear velocity of the mixed stream;
separating an incompressible fluid product stream from the mixed stream, where the incompressible fluid product stream comprises at least a portion of the constituent of the mixed stream, and where the incompressible fluid product stream is separated from the mixed stream as a result of the rotational velocity imparted to the mixed stream;
separating at least a portion of the second compressible component from the mixed stream as a first compressible product stream; and
separating at least a portion of the first compressible component from the incompressible fluid product stream as a second compressible product stream.

2. The method of claim 1 further comprising the step of treating the first compressible product stream in a polishing unit.

3. The method of claim 1 wherein the mixed stream has a resultant velocity or a linear velocity with a Mach Number of greater than 0.1 at some point in the separation step.

4. The method of claim 1 further comprising mixing the incompressible fluid product stream from which at least a portion of the first compressible component has been separated with the compressible feed stream.

5. The method of claim 1 wherein separating an incompressible fluid product stream from the mixed stream, and separating at least a portion of the first compressible component from the incompressible fluid product stream requires less than 1,200 Btu per pound of first compressible component separated.

6. The method of claim 1 wherein the first compressible component comprises carbon dioxide that is separated into the second compressible product stream.

7. The method of claim 6 further comprising injecting the second compressible product stream into a subterranean formation.

8. The method of claim 1 wherein the combustion source utilizes a high sulfur fuel and wherein the first compressible component comprises sulfur dioxide.

9. The method of claim 8 further comprising separating at least a portion of the sulfur dioxide from the incompressible fluid product stream and liquefying the sulfur dioxide.

10. The method of claim 1 wherein the incompressible fluid is at a temperature below 0 ° C.

11. A system comprising:
a separation device that:
1) receives
a) a compressible feed stream comprised of a first compressible component and a second compressible component, where the compressible feed stream is derived from a combustion process, and
b) an incompressible fluid stream comprised of an incompressible fluid capable of absorbing the first compressible component or reversibly reacting with the first compressible component, and
2) discharges a first compressible product stream comprising at least 60% of the second compressible component and an incompressible fluid product stream comprising at least 60% of the first compressible component or a chemical compound or adduct of a reversible reaction between the incompressible fluid stream and the first compressible component;

an incompressible fluid regenerator that receives the incompressible fluid product stream and discharges a second compressible product stream enriched in the first compressible component and a first compressible component-depleted incompressible fluid product stream; and an incompressible fluid injection device that receives the first compressible component-depleted incompressible fluid product stream and mixes the first compressible component-depleted incompressible fluid product stream with the compressible feed stream.

12. The system of claim 11 wherein the compressible fluid separation device comprises a centrifugal force separator.

13. The system of claim 11 wherein the first compressible component comprises sulfur dioxide and the second compressible product stream comprises the sulfur dioxide.

14. A method comprising:

providing a compressible feed stream comprised of a first compressible component and a second compressible component, where the compressible feed stream is derived from a combustion source;

selecting an incompressible fluid and providing an incompressible fluid stream comprising the incompressible fluid, wherein the incompressible fluid is selected to selectively absorb or reversibly react with the first compressible component relative to the second compressible component;

mixing the compressible feed stream and the incompressible fluid stream in a substantially co-current flow to form a mixed stream;

inducing a rotational velocity to the mixed stream; and separating an incompressible fluid product stream from a compressible product stream, where the incompressible fluid product stream contains an increased amount of the first compressible component or a chemical compound or adduct formed by a reversible reaction between the incompressible fluid of the incompressible fluid stream and the first compressible component relative to the incompressible fluid stream and the compressible product stream contains a reduced amount of the first compressible component relative to the compressible feed stream, and where the incompressible fluid product stream is separated from the mixed stream as a result of the rotational velocity imparted to the mixed stream;

separating a second compressible product stream comprising the first compressible component from the incompressible fluid product stream.

15. The method of claim 14 further comprising mixing the incompressible fluid product stream from which the second compressible product stream comprising the first compressible component has been separated with the compressible feed stream.

16. The method of claim 14 wherein the incompressible fluid comprises a physical solvent.

17. The method of claim 14 wherein the incompressible fluid comprises a chemical solvent.

* * * * *